(12) United States Patent
Niemer et al.

(10) Patent No.: US 10,861,623 B2
(45) Date of Patent: Dec. 8, 2020

(54) MODULAR WIRE MANAGEMENT SYSTEMS, APPARATUSES AND METHODS

(71) Applicant: Ran Technologies, Inc., Houston, TX (US)

(72) Inventors: Roman M. Niemer, Houston, татTX (US); Alex R. Niemer, Houston, TX (US)

(73) Assignee: Ran Technologies, Inc., Houston, TX (US)

( * ) Notice: Subject to any disclaimer, the term of this patent is extended or adjusted under 35 U.S.C. 154(b) by 542 days.

(21) Appl. No.: 15/404,824

(22) Filed: Jan. 12, 2017

(65) Prior Publication Data

US 2017/0250530 A1  Aug. 31, 2017

Related U.S. Application Data

(60) Provisional application No. 62/300,310, filed on Feb. 26, 2016.

(51) Int. Cl.
*H01B 17/00* (2006.01)

(52) U.S. Cl.
CPC ................................. *H01B 17/00* (2013.01)

(58) Field of Classification Search
CPC ............ H01B 17/00; F16L 3/085; F16L 3/12
USPC .............. 285/149.1, 152.1, 154.1; 211/6, 16, 211/88.04, 105.1, 123, 204, 206, 182; 248/80, 68.1, 65, 67, 55, 49, 48
See application file for complete search history.

(56) References Cited

U.S. PATENT DOCUMENTS

| | | | | |
|---|---|---|---|---|
| 1,035,100 A | * | 8/1912 | Peterson | A47F 5/02 |
| | | | | 211/165 |
| 1,044,889 A | * | 11/1912 | Hyde | A47B 57/20 |
| | | | | 108/106 |
| 1,190,453 A | * | 7/1916 | Pease | A47K 10/04 |
| | | | | 211/123 |
| RE15,037 E | * | 2/1921 | Feldman | A47B 61/003 |
| | | | | 211/182 |
| 1,450,084 A | * | 3/1923 | Hull | A47F 7/04 |
| | | | | 211/182 |

(Continued)

FOREIGN PATENT DOCUMENTS

| | | |
|---|---|---|
| EP | 0998000 A2 | 5/2000 |
| JP | 11132362 A | 5/1999 |

*Primary Examiner* — David Bochna
*Assistant Examiner* — James A Linford
(74) *Attorney, Agent, or Firm* — Osha Bergman Watanabe & Burton LLP

(57) ABSTRACT

Modular wire management systems may include connectors configured for mounting on a base and for connecting to extension members, thereby connecting extension members to one another, to form a framework for managing and routing wires at one or more heights above the base. The systems may further include securing members configured to secure wires to the framework. Modularity may be provided in that every extension member may be connectable to every connector, and every connector may be connectable to every extension member. Connections may be achieved by secure but detachable friction fit, providing both stability and easy reconfigurability. Flexibility of configurability may be provided by a wide range of different kinds of connectors. Connectors may be provided with non-electrically conductive mounting portions for connecting to the base. Apparatuses and methods are also provided.

11 Claims, 12 Drawing Sheets

(56) References Cited

U.S. PATENT DOCUMENTS

| | | | |
|---|---|---|---|
| 2,016,284 A * | 10/1935 | Knight | H02G 3/0616 16/108 |
| 3,104,778 A | 9/1963 | Leonard | |
| 3,906,146 A | 9/1975 | Taylor | |
| 3,910,536 A | 10/1975 | Sharp et al. | |
| 5,401,010 A | 3/1995 | Haswell et al. | |
| 5,530,787 A | 6/1996 | Arnett | |
| 5,690,237 A * | 11/1997 | Marzec | A47K 3/003 211/105.1 |
| 5,743,412 A * | 4/1998 | Noble | A47F 1/121 211/182 |
| 5,806,814 A * | 9/1998 | White | B65H 75/366 137/355.16 |
| 6,340,141 B1 | 1/2002 | Rinderer | |
| 6,383,001 B2 | 5/2002 | Sawayanagi | |
| 6,600,107 B1 | 7/2003 | Wright et al. | |
| 6,885,805 B2 | 4/2005 | Asada | |
| 7,352,947 B2 | 4/2008 | Phung et al. | |
| D660,251 S | 5/2012 | Liber et al. | |
| 8,322,541 B2 * | 12/2012 | Maclaren-Taylor | A47K 10/06 211/123 |
| 8,330,043 B2 | 12/2012 | Alaniz et al. | |
| 8,533,912 B2 * | 9/2013 | Tran | A47B 95/02 16/110.1 |
| 8,950,600 B2 * | 2/2015 | Sisto | F16B 7/0493 211/105.1 |
| D737,783 S | 9/2015 | Smith | |
| 2007/0131635 A1 * | 6/2007 | Shieh | A47B 47/0058 211/204 |
| 2010/0181438 A1 | 7/2010 | Chauzu et al. | |
| 2010/0224737 A1 | 9/2010 | LaFontaine et al. | |
| 2012/0000704 A1 | 1/2012 | Yamashita | |
| 2012/0126067 A1 | 5/2012 | Chauzu et al. | |
| 2015/0129723 A1 | 5/2015 | Hanaoka et al. | |
| 2015/0214703 A1 | 7/2015 | Larsen et al. | |
| 2015/0331217 A1 | 11/2015 | Kaplan | |
| 2016/0061354 A1 | 3/2016 | Abby et al. | |

* cited by examiner

104-E-90-2L

104-ST-2L

104-ST-90-2L

104-D-2L

104-T-90-2L

104-X-2L

MODULAR WIRE MANAGEMENT SYSTEMS, APPARATUSES AND METHODS

CROSS-REFERENCE TO RELATED APPLICATIONS

This application claims the benefit of the filing date of U.S. Provisional Patent Application No. 62/300,310, filed on Feb. 26, 2016, by the inventors of this application, and incorporated herein by reference.

STATEMENT REGARDING FEDERALLY SPONSORED RESEARCH

Not applicable.

TECHNICAL FIELD OF THE INVENTION

The present disclosure relates generally to wire routing and management. More particularly, the disclosure relates to modular, configurable and reconfigurable, multi-level systems, apparatuses and methods for the same.

BACKGROUND

An industrial control panel or the like may have a large number of wires to be routed and connected among various electrical elements. While some wires are to be routed together, e.g., in bundles of wires, other wires or bundles should be kept separate, e.g., to separate wires of different voltages or to protect high performance cable. For safety and to permit easy troubleshooting (e.g., determining the source of an electrical problem, repairing and replacing wires), the wires should be routed in an organized manner, rather than in a haphazard, jumbled, 'spaghetti ball'. The task of connecting and routing a large number of wires in a manner that is efficient, safe, organized, and aesthetically satisfactory can be challenging. Compounding the difficulty is the fact that the 'real estate' or spatial area available on the surface over which the wires are being routed may be quite limited relative to the number of wires, paths or routes, and connections required. Further, the optimal routing setup or configuration may not be clear at the outset; it may be determined as the configuration is created, including by trial and error. In addition, once an initial configuration is created, electrical elements may be added, deleted or replaced, or their arrangement may be changed, for example, for purposes of repair, upgrade, system modification, etc. Such changes may require addition or elimination of wiring, which in turn may call for addition, elimination, or modification of wire routing/management components (e.g., raceways, ducts, channels, cable trays, track, tubing, etc.) and hence modification of the overall wire routing/management configuration.

SUMMARY

According to a first aspect of the invention, there is provided a system comprising one or more extension members, configured for routing wire, and a plurality of connectors, each configured (i) for connecting one or more of the one or more extension members to one or more other ones of the one or more extension members, and (ii) for connecting to a base.

According to a second aspect of the invention, there is provided a system comprising one or more extension members, configured for routing wire, and a plurality of connectors, each configured for connecting one or more of the one or more extension members to one or more other ones of the one or more extension members. Each of the one or more extension members is configured for connection to any of the plurality of connectors, and each of the plurality of connectors is configured for connecting to any of the one or more extension members.

According to a third aspect of the invention, there is provided a system comprising wire routing members configured for connection to a base. The wire routing members are further configured for holding one or more wires at different distances from the base.

According to a fourth aspect of the invention, there is provided a system comprising one or more extension members, configured for routing wire, and a plurality of connectors, each configured for connecting one or more of the one or more extension members to one or more other ones of the one or more extension members. Each of the one or more extension members comprises a male connecting portion and each of the plurality of connectors comprises a female connecting portion, wherein the male connecting portion and the female connecting portion are configured for interconnection by a friction fit.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATIONS AND NOMENCLATURE

Figure 1:
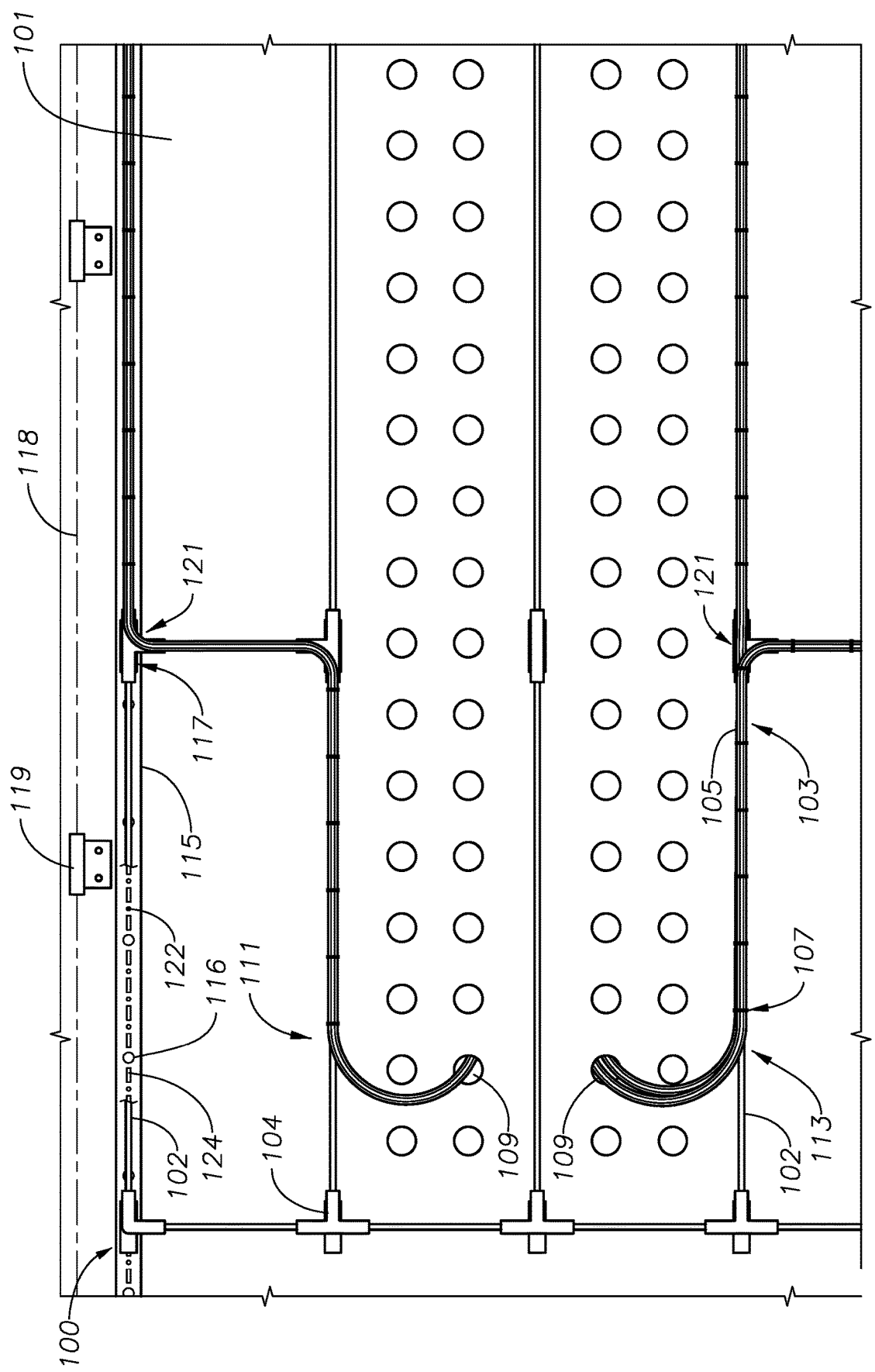
FIG. 1 is a three-dimensional perspective view of a (portion of a) wire management system mounted on a base, in accordance with some disclosed embodiments.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

The terms "connect," "attach," "join," and the like are used interchangeably herein. Also, the expressions (1) "A is connected to B," (2) "B is connected to A," and (3) "A and B are connected to each other," and like expressions, are interchangeable. Also, these terms "connect," "attach," "join," and the like are intended to mean either an indirect or direct connection. Thus, if a first element is connected to a second element, that connection may be direct (the first element is connected directly to the second element, without intermediary between the two elements) or indirect (the first element is connected to the second element via one or more other elements or connections). The negatives of the terms "connect," "attach," "join," and the like and expressions (e.g., "disconnect," "detach") are used in like manner.

The term "routing members" refers collectively to (a) the extension members and (b) the connectors (described below in the Detailed Description). The terms "routing members" and "wire routing members" are used interchangeably herein. The term "wire guiding elements" refers collectively to (a) the extension members and (b) the connecting portions of the connectors (described below in the Detailed Description).

The terms "wire path," "wire route," and the like refer to the path or route followed by the wire(s) or the path or route for wires established by the framework of extension members and connectors, as will be understood by context, as described herein. As described herein, in an actual configuration of the system in use the wires generally substantially follow/align with the extension members and connectors but may also deviate from them, e.g., to a small degree to effect turns, and to a large degree where the wires depart from the framework to connect to electrical elements. Unless indicated otherwise, the terms "wire path," "wire route," and the like are not intended to include the large departures from the framework that the wires make in order to connect to electrical elements. As for the small deviations to effect turns, unless indicated otherwise, the terms "wire path," "wire route," and the like would include these deviations when those terms refer to the path or route followed by the wire(s) but would not necessarily include these deviations when those terms refer to the path or route for wires established by the framework of extension members and connectors.

This application refers to "wires" and to "bundles of wires." Where only one of these terms is mentioned, it is to be understood that that term encompasses the other term as well, unless indicated to the contrary. That is, where "wires" is mentioned without "bundles of wires," it is to be understood that reference is being made to wires and/or bundles of wires, unless indicated to the contrary; where "bundles of wires" is mentioned without "wires," it is to be understood that reference is being made to wires and/or bundles of wires, unless indicated to the contrary.

While a Cartesian coordinate system in certain figures defines x, y, and z axes, the term "x-y plane" does not necessarily refer to the specific x-y plane formed by the illustrated x and y axes but may refer to that plane or any plane parallel to that plane.

The term "substantially" is not to be understood as precluding the unqualified case, that is, e.g., if an extension member is referred to as "substantially straight," this locution does not exclude the case in which the extension member is unqualifiedly straight.

DETAILED DESCRIPTION OF DISCLOSED EMBODIMENTS

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. Thus, the following detailed description of exemplary embodiments, read in conjunction with the accompanying drawings, is merely illustrative and is not to be taken as limiting the scope of the invention. Rather, the scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

The instant inventors have developed modular wire management systems, apparatuses, and methods that address the challenges of wire management and the desired functionalities of wire management systems, apparatuses, and methods, as described above. The systems, apparatuses, and methods for wire management described herein are flexible and versatile (for initial construction (configuration) and for later modification (reconfiguration)), are easy and quick to assemble and disassemble, and permit organized, efficient (e.g., space saving), safe and aesthetic setups for routing wires. In addition, the instant wire management systems, apparatuses and methods securely hold in position the wires being routed, and provide for securely holding the system components and apparatuses to a base (such as a door of an industrial control panel or the like).

While the following discussion will focus primarily on limited aspects of the instant systems, apparatuses, and methods with reference to specific figures, in many cases the figures illustrate additional aspects of the instant systems, apparatuses, and methods.

First, FIG. 1 will be discussed as illustrating an overall wire management system, including the wiring and the securing of the wiring to the routing components of a modular wire management system. Second, FIGS. 2-22 will be used to introduce basic types of components of a modular wire management system, including extension members (FIG. 2) and connectors, the connectors being of various different types (FIGS. 3-22). Third, FIGS. 23-25 and other figures will be used to describe the basic construction or assembling and disassembling of a modular wire management system and examples of configurations of a modular wire management system. Fourth, FIGS. 1 and 23 and other figures will be used to discuss examples of securing components of a modular wire management system to a base (e.g., a surface over which the wires are routed, such as a surface of or associated with an industrial control panel or the like). Fifth, additional observations concerning components and features of the system, further variations, and potential advantages of the system will be discussed.

FIG. 1 is a three-dimensional, perspective view of a modular wire management system 100 comprising an assembled framework or configuration mounted on a base 101, in accordance with some disclosed embodiments (only a portion of the modular wire management system 100 and base 101 are shown). Further, FIG. 1 is a view from above looking down upon the assembled framework or configuration mounted on base 101. While in FIG. 1 the base 101 is depicted as a door of an industrial control panel, the modular wire management system 100 may be employed in different contexts. Accordingly, a door of an industrial control panel or the like is just one non-limiting example of a base 101.

As seen in FIG. 1, bundles 103 of wires 105 are routed along extension members 102 of a modular wire management system 100. The extension members 102 may also be referred to as (extension) rods, bars, or tubes. The bundles 103 of wires 105 may be secured to the extension members 102 and/or to connectors 104 (described below) by one or more securing members 107, which may be cable ties (also referred to as zip ties), as illustrated, or any suitable securing means. Securing members 107 may be employed every given amount of length (e.g., every 3 or 4 inches) along an extension member 102, as shown. The bundles 103 of wires 105 so secured may run along the extension members 102, adjacent to and with at least some of the wires 105 touching the extension members 102, as illustrated. If alternative securing means (not shown) are employed, the wires 105 may not be touching the extension members 102 and may not be so closely aligned with the extension members 102.

In other alternative arrangements, the extension members 102 (described below with reference to FIG. 2) may comprise hollow members (e.g., tube-like structures, with circular, rectangular or other cross-sections), and the wires 105 may be routed through, i.e., inside, the extension members 102, instead of alongside them, exterior to them, as shown. Such hollow members may have a continuous, closed exterior surface (e.g., like a pipe, without holes, openings, etc.) or an exterior surface that is discontinuous, i.e., having gaps, openings, slots, or the like (e.g., like a wire mesh or cage, slotted, etc.). In yet other alternative arrangements, the extension members 102 may comprise open channels, trays, tracks, or the like. Such a channel, etc. could take the form of, e.g., a pipe (having a circular or rectangular cross-section) cut in half lengthwise, with the top half removed. In these arrangements, the wires 105 may lie in the channels, etc. and in some cases may also be partly or fully secured in the channels, etc. (described below). Again, such an open channel, etc. may comprise a continuous, closed exterior surface or an exterior surface that is discontinuous, with gaps, etc. as described above.

Returning to FIG. 1, at various locations in the modular wire management system 100 (e.g., at various locations 111, 113 along the framework formed collectively by extension members 102 and connectors 104), the bundles 103 of wires 105 depart from running alongside the framework and go to the electrical elements or components (not shown) to which the wires 105 are connected. In FIG. 1, there are two such departures 111, 113 shown, and the bundles 103 of wires 105 after departure from the framework extend through holes 109 in the base 101 to reach the electrical elements. The arrangement and routing of the wires 105 after they depart from the framework may be otherwise than illustrated, e.g., other than going through holes 109 in the base 101 to reach the electrical elements.

FIGS. 2 and 3-22 illustrate examples of two of the basic components of a modular wire management system 100. These figures illustrate these components as separate individual components, that is, not as part of an assembled framework or configuration. These separate individual components, namely, extension members 102 (FIG. 2) and connectors 104 (FIGS. 3-22), will now be described.

Figure 2:
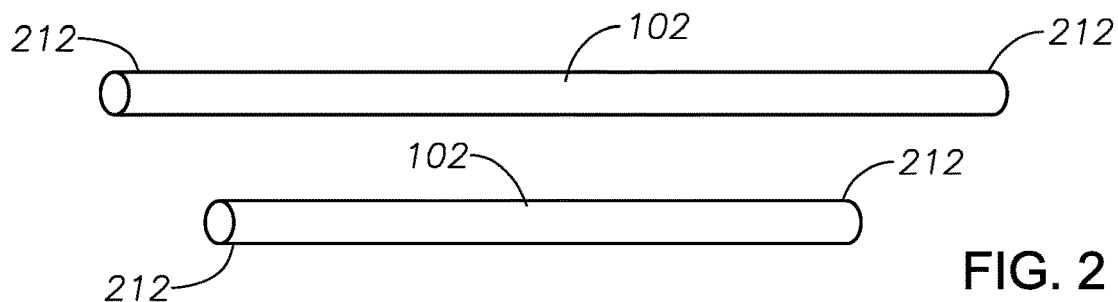
FIG. 2 is a three-dimensional perspective view of two extension members of different lengths, for use in a wire management system, in accordance with some disclosed embodiments.

FIG. 2 is a three-dimensional perspective view of two extension members 102 of different lengths, in accordance with some disclosed embodiments. An extension member 102 may be a separate individual component of modular wire management system 100, i.e., separate from the other components. An extension member 102 may be in the shape of a rod, bar or the like, as illustrated. That is, extension member 102 may be relatively long and thin, substantially straight, i.e., extending in a single direction (e.g., the x direction in FIG. 3), with a cross-section that may be circular or of another shape. Extension member 102 may be hollow, like a pipe or tube, or, in contrast, solid throughout its extent, like a pipe whose hollow portion has been completely filled in with solid material, rendering it homogenously solid (though of course, it need not be made of the same material throughout). Other variations of extension member 102 have been described above (e.g., discontinuously solid, as in a wire mesh or cage; open channels; etc.).

While FIG. 2 shows two extension members 102 of different lengths, it will be understood that in some embodiments all extension members 102 have the same length. In other embodiments, at least some extension members 102 have different lengths. Further, for any given characteristic (e.g., cross-sectional shape), in some embodiments, all extension members 102 have the same characteristic, while in other embodiments, not all the extension members 102 have the same characteristic. Thus, extension members 102 may have lengths, cross-sectional shapes, and/or other characteristics different than those illustrated in the figures of this disclosure. Though not required, in the embodiments illustrated in this disclosure all extension members 102 have the same (uniform) cross-sectional shape and size, to achieve optimal modularity (discussed below). In other embodiments, different (groups of) extension members 102 may have different cross-sectional shapes and sizes. By cross-sectional size is meant, e.g., the diameter or area in the case of a circular cross-section. In the case of cross-sections of another shape, cross-sectional size would refer to a similar or analogous dimension, e.g., the diagonal, length or area in the case of a square cross-section. By providing that all extension members 102 are of uniform cross-sectional size and shape (and all connector 104 (leg 344) openings 345 (see, e.g., FIG. 3) are of matching (mating) uniform cross-sectional size and shape, described below), all extension members 102 are interconnectable/interoperable with all connectors 104, which renders all extension members 102 interchangeable with each other in this respect, and all connectors 104 interchangeable with each other in this respect (i.e., for purposes of connecting for assembling a framework or configuration), thus providing great flexibility, simplicity, and ease of use.

FIGS. 3-22 show connectors 104 of varying types and heights, in accordance with some disclosed embodiments. Similarly to an extension member 102, a connector 104 is a separate individual component of modular wire management system 100. (While each of the specific types of connectors shown in FIGS. 3-22 is referred to by a reference numeral including "104" and a suffix, e.g., "-E" (in FIG. 3), any or all of these connectors are generically referred to herein as 104.) A connector 104 has one or more holes or openings 345, each hole or opening 345 having a cross-sectional shape and size for mating with an extension member 102. Again, though not required, in the embodiments illustrated in this disclosure all holes or openings 345 of all connectors 104 have the same (uniform) cross-sectional shape and size, to achieve optimal modularity. An extension member 102 is connected to a connector 104 by inserting an end (longitudinal end) 212 of the extension member 102 into an opening 345 of the connector 104 (described further below). (FIGS. 3-22 are not necessarily drawn to the same scale as FIG. 2.) Thus, the extension member 102 may be understood as a male member and the connector 104 a female member. As described below, the connection between an extension member 102 and a connector 104 is secure but the extension member 102 and connector 104 may easily be disconnected.

Extension members 102 may be made of metal or another material, preferably of sufficient strength and rigidity to achieve stable support of wire bundles 103 and secure retention of extension members 102 in connectors 104. Connectors 104, in particular the legs 344 thereof, may be made of plastic, rubber or the like, or another material, preferably characterized by (i) sufficient flexibility and resilience for easy insertion of extension members 102 into connectors 104 and easy removal therefrom, and (ii) sufficient strength and rigidity and providing sufficient compressive force upon (the leg 212 of) extension member 102 inserted therein to achieve stable support of extension members 102 and secure retention of extension members 102 in connectors 104. In some embodiments, the entire connector 104 is made of the same material, although in other embodiments, while the legs 344 are made of a material as here stated, the other portions of the connector 104 (e.g., the mounting portion 341 and stem 342) may be made of different materials. While the mounting portion 341 and stem 342 do not necessarily require the same degree of flexibility and resilience as do the legs 344, they preferably have sufficient strength and rigidity to provide stable mounting on base 101 and support of extension members at a fixed distance from (height above) base 101.

Let us turn to FIGS. 3-22 to describe specific different types of connectors 104. Various components, features, dimensions, axes, and the like are explicitly indicated via reference numerals in some of FIGS. 3-22, and these indications are applicable, mutatis mutandis, to corresponding components, features, dimensions, axes, and the like in the others of FIGS. 3-22 (as well as in FIGS. 1 and 23-25) even if the latter components, features, dimensions, axes, and the like lack reference numerals.

Figure 3:
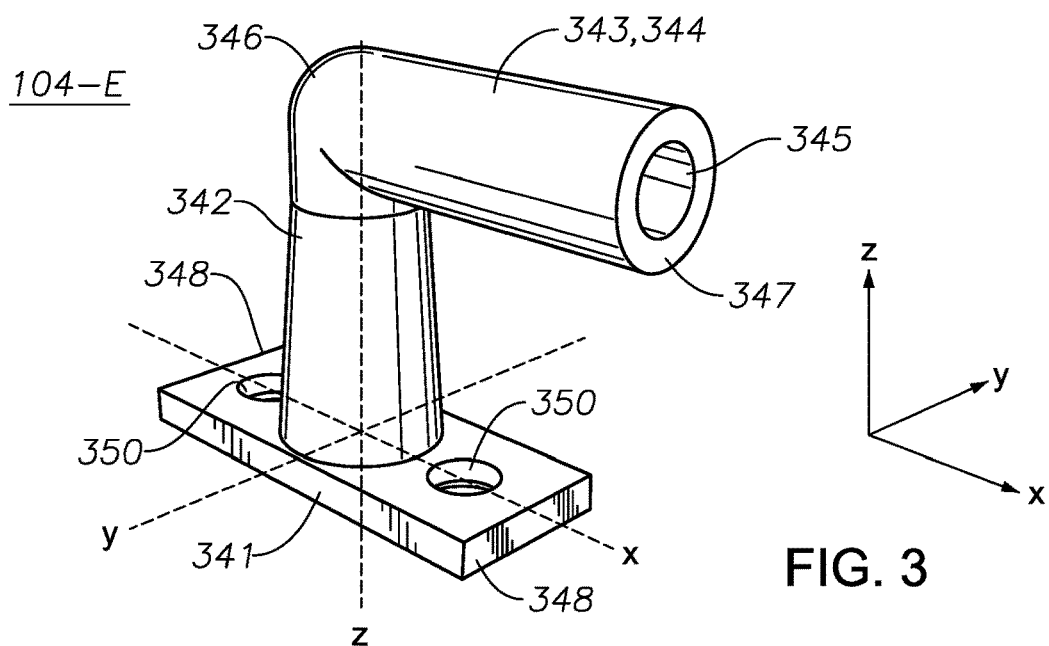
FIG. 3 is a three-dimensional perspective view of a parallel end (E) connector, for use in a wire management system, in accordance with some disclosed embodiments.

For convenience a Cartesian coordinate system defined by x, y, and z axes may be used in the description of the wire management system 100 and its components. An exemplary Cartesian coordinate system is shown in FIG. 3, but applies also, mutatis mutandis, to FIGS. 1 and 4-25. The x and y axes define the plane of the base 101 (not shown in FIGS. 3-22 but shown in other figures, e.g., FIG. 1), and the z axis is used to measure height above the base 101 (height above the base may also be referred to as level or elevation relative to the base 101 or distance from the base 101). For all of FIGS. 3-22, the x axis is defined as the central longitudinal axis (dotted line x, FIG. 3) of the mounting portion 341 (described below) of the connector 104, and the z axis is defined as the central longitudinal axis (dotted line z, FIG. 3) of the stem 342 (described below) of the connector 104.

Before turning to each type of connector and each of FIGS. 3-22 individually, a general description applicable to the various connectors 104 illustrated in FIGS. 3-22 will be provided. Note that, in some variant embodiments generally described elsewhere in this disclosure, connectors 104 may have characteristics that deviate from this general description. For this general description, the reader is directed to the reference numerals in FIG. 1-22.

Each connector 104 may be understood as having a connecting portion 343, a mounting portion 341, and a stem 342. The connecting portion 343, mounting portion 341, and stem 342 may be formed as three separate individual elements joined together, or as a single unitary element, or the stem 342 and one of the connecting portion 343 and the mounting portion 341 may be formed as a single unitary element. The connecting portion 343 and the stem 342 may collectively be referred to as the non-mounting portion of the connector 104. The stem 342 and the mounting portion 341 may collectively be referred to as the non-wire-guiding portion of the connector 104.

The connecting portion 343 is used to connect the connector 104 to one or more extension members 102. The mounting portion 341 is used to connect the connector 104 to the base 101 (shown in FIG. 1). The stem 342, via its extent in the z or height direction, connects the connecting portion 343 to the mounting portion 341, at/around the longitudinal center (indicated by the dotted line y, FIG. 3) of the mounting portion 341. While this location of the stem 342 relative to the mounting portion 341 may promote stability, in some embodiments the stem 342 may be formed on the mounting portion 341 at another location on the mounting portion 341. (The dotted line y is the central axis in the width direction of the mounting portion 341, while the dotted line x is the central longitudinal axis, that is, the central axis in the length direction, of the mounting portion 341.)

The mounting portion 342 may, but need not, be formed of a material that is electrically insulating or not electrically conductive. This may serve to avoid the conducting of electricity between (a) the wires 105, extension members 102, or another portion of the connector 104, and (b) the base 101. An example of an electrically insulating or non-conductive material of which the mounting portion 341 may be formed is a thermoplastic polymer. An example of a thermoplastic polymer of which the mounting portion 341 may be formed is acrylonitrile styrene acrylate (ASA). The mounting portion 341 may also be formed of other materials.

A connecting portion 343 may have one or more legs 344. A leg 344 is a straight portion having two longitudinal ends (e.g., 346, 347 in FIG. 3). Generally, a leg 344 connects to the stem 342 at one longitudinal end 346 of leg 344, and the leg 344 has an opening 345 for connecting to (a longitudinal end 212 of) an extension member 102 at the other longitudinal end 347 of leg 344; thus, the stem 342 generally lies at a longitudinal end 346 of a leg 344. (In some cases, e.g., with regard to straight connectors 104-ST in FIG. 5 and 104-ST-90 in FIG. 6, as discussed below, the location of the stem 342 relative to the legs 344 may be characterized differently). Each leg 344 may connect to one extension member 102, at the end (e.g., 347) of the leg 344 that has an opening 345. As mentioned above, opening 345 has a cross-sectional shape and size for mating with an extension member 102. As mentioned above, in some embodiments, openings 345 of all legs 344 of all connectors 104 have the same (uniform) cross-sectional shape and size, for mating with all extension members 102 (which may also all have a uniform cross-sectional shape and size, configured for mating with openings 345), so as to achieve optimal modularity. In the illustrated embodiments, the uniform cross-sectional shape of openings 345 is circular. In other embodiments, other shapes of openings 345 are possible.

Depending on the particular leg 344 and the particular type of connector 104, the leg 344 extends either parallel to (longitudinally aligned with) the longitudinal extent (the extent in the direction of the longitudinal axis) of the mounting portion 341 (i.e., the leg 344 extends in the direction x) (these legs 344 may be referred to as "parallel legs"), or perpendicular to the longitudinal extent of the mounting portion 341 (i.e., the leg 344 extends in the direction y) (these legs 344 may be referred to as "perpendicular legs"). Thus, where two (or more) legs 344 meet each other at the stem 342, any two legs 344 meet each other at an angle (in the x-y plane) of 90 degrees or 180 degrees, depending on the particular leg 344 and the particular type of connector 104. For example, in the case of straight connector 104-ST shown in FIG. 5, the two legs 344 meet at an angle of 180 degrees; in the case of elbow connector 104-D shown in FIG. 7, the two legs 344 meet at an angle of 90 degrees.

Where (as in FIG. 3) the leg 344 extends parallel to (longitudinally aligned with) the longitudinal extent of the mounting portion 341 (i.e., in direction x), the leg 344 may extend from the longitudinal center of the mounting portion 341 to just beyond one longitudinal end 348 of the mounting portion 341. Where (as in FIG. 4) the leg 344 extends perpendicular to the longitudinal extent of the mounting portion 341, the leg 344 may extend from the longitudinal center of the mounting portion 341 in a direction perpendicular to the longitudinal extent of the mounting portion 341 (i.e., in direction y). In some embodiments, all legs 344 have the same length. In some embodiments, all legs 344 may have different lengths; in some embodiments, some legs 344 have the same length and some legs 344 have lengths different from the lengths of other legs 344. In some embodiments, legs 344 and mounting portions 341 may have lengths different from the lengths illustrated herein, e.g., in the case of parallel legs 344, legs 344 may extend in the x direction beyond longitudinal end 348 of mounting portion 341 (e.g., as seen in FIG. 5), just up to longitudinal end 348 of mounting portion 341, or not as far as longitudinal end 348 of mounting portion 341.

A connection portion 343 may have multiple legs 344 disposed at the same level or height or at different levels or heights (relative to the base 101 or to the (top or bottom of the) mounting portion 341). Where a connection portion 343 has more than one leg 344 at the same level, these multiple legs 344 connect with each other at the stem 342. In some embodiments, where any two legs 344 connect with each other at the stem 342, there may be a passage from one leg 344 through the stem 342 to the other leg 344; in other embodiments, there is not such a passage. In some embodiments, one or more legs 344 may be completely hollow throughout their length such that an extension member 102 may be passed completely through the leg 344, i.e., the extension member 102 entering the leg 344 at an opening 345 at one end longitudinal end 347 thereof and exiting the leg 344 at an opening 345 at the other longitudinal end 346 thereof (such embodiment with a leg 344 having openings 345 at both longitudinal ends 346, 347 thereof is not explicitly shown in the figures, but is not inconsistent with some of the illustrated legs 344, e.g., in FIG. 3, a non-illustrated opening 345 could exist at longitudinal end 346 facing the background—facing away from the viewer). In some embodiments, some or all of the legs 344 are not hollow throughout their length, but rather are open at one end 347 (which has leg opening 345) and closed at the other end 346 (at stem 342). In general, as mentioned, at the longitudinal end (e.g., 347) opposite the stem 342, each leg 344 has an opening 345 for connection to an extension member 102, so the leg 344 will be hollow at that end (e.g., 347).

In alternate embodiments, legs 344 may have different lengths, legs 344 may meet each other at angles (in the x-y plane) other than 90 or 180 degrees, legs 344 may not be straight throughout their length, and legs 344 may not be parallel or perpendicular to the longitudinal direction of the mounting portion 341. The mounting portion 341 may have a shape different from that shown. In some embodiments, leg(s) 344 may extend longitudinally farther beyond the longitudinal end of mounting portion(s) 341 than shown. In some embodiments, mounting portion(s) 341 may have a greater longitudinal extent, and leg(s) 344 may extend longitudinally not all the way to the longitudinal end(s) of mounting portion(s) 341. Other variations are also possible, as will be appreciated by one of ordinary skill in the art.

Further detail will now be provided for each of the specific connectors 104 of FIGS. 3-22. In view of the corresponding nature of the parallel and perpendicular connectors of the same kind (e.g., of connectors 104-E and 104-E-90), the same reference numerals and characters as used for the one (e.g., parallel connector 104-E illustrated in FIG. 3) are generally applicable to the other (e.g., perpendicular connector 104-E-90 illustrated in FIG. 4). For simplicity, the reference numerals are generally omitted in the figures illustrating the perpendicular connectors. (The terms "parallel connector" and "perpendicular connector" are defined below.)

Figure 4:
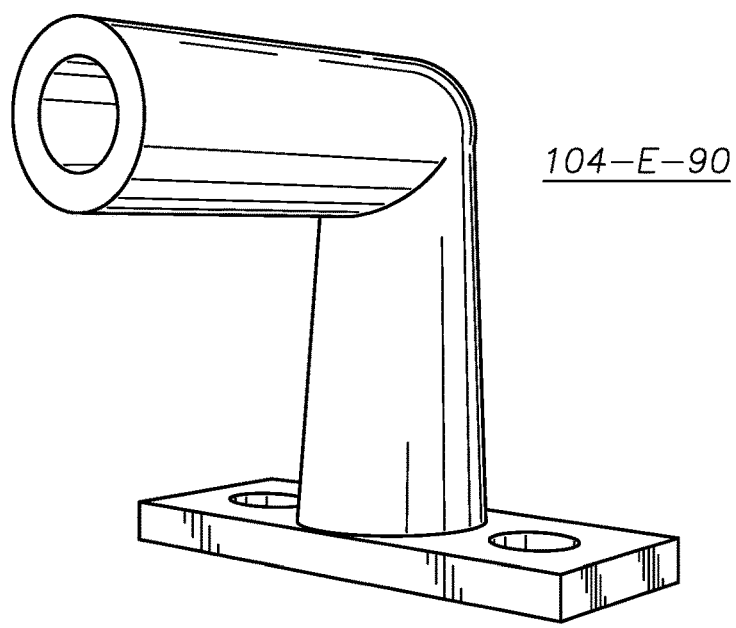
FIG. 4 is a three-dimensional perspective view of a perpendicular end (E-90) connector, for use in a wire management system, in accordance with some disclosed embodiments.
Figure 5:
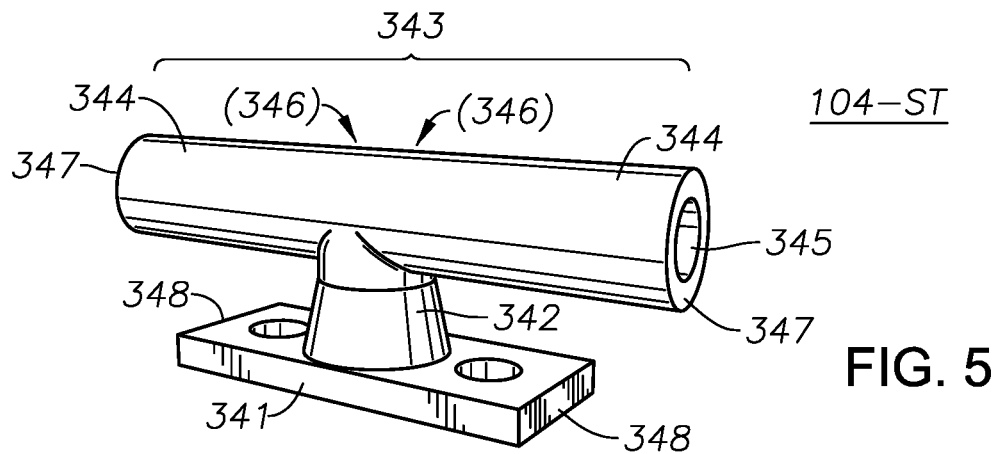
FIG. 5 is a three-dimensional perspective view of a parallel straight (ST) connector, for use in a wire management system, in accordance with some disclosed embodiments.

Each of the connectors 104 shown in FIGS. 3 and 4 is an end connector. An end connector is a connector 104 that has a connecting portion 343 that has, at a given height above the base 101, only a single leg 344.

FIG. 3 shows an end connector 104-E where the connection portion 343 (or leg 344) is longitudinally aligned with (parallel to) the mounting portion 341; this connector type may be referred to as E. FIG. 4 shows an end connector 104-E-90 where the connection portion 343 (or leg 344) is perpendicular to the mounting portion; this connector type may be referred to as E-90.

Figure 6:
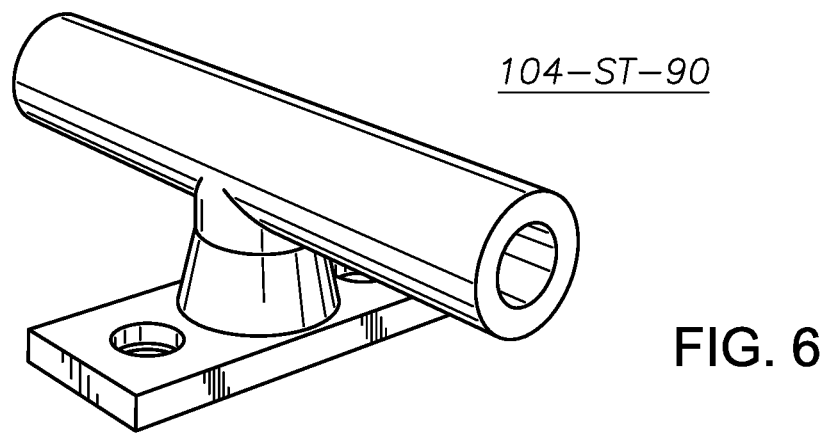
FIG. 6 is a three-dimensional perspective view of a perpendicular straight (ST-90) connector, for use in a wire management system, in accordance with some disclosed embodiments.

Each of FIGS. 5 and 6 shows a straight connector 104. A straight connector 104 is a connector 104 that has a connecting portion 343 that has, at a given height above the base 101, two legs 344, and the two legs 344 meet or intersect with each other at an angle of 180 degrees.

FIG. 5 shows a straight connector 104-ST in which the legs 344 are longitudinally aligned with (parallel to) the mounting portion 341; this connector type may be referred to as ST. FIG. 6 shows a straight connector 104-ST-90 where the legs 344 are perpendicular to the mounting portion 341; this connector type may be referred to as ST-90. In an ST connector (FIG. 5), one leg 344 extends from the longitudinal center of the mounting portion 341 to (just beyond) one longitudinal end 348 of the mounting portion 341, and the other leg 344 extends from the longitudinal center of the mounting portion 341 to (just beyond) the other longitudinal end 348 of the mounting portion 341. In an ST-90 connector (FIG. 6), the two legs 344 extend from the longitudinal center of the mounting portion 341 in opposite directions, both perpendicular to the longitudinal direction of the mounting portion 341. In a straight connector, 104-ST or 104-ST-90, the two legs 344 may both be completely hollow throughout their length so as to form a single hollow, pipe-like structure. Alternatively, the interior of the legs 344 may not be completely hollow, e.g., at/near the stem (or elsewhere), but rather may be internally closed or blocked (e.g., solid, not hollow), so that the passage from (the opening 345 of) one leg 344 to the (opening 345 of the) other leg 344 is blocked, at the location of the stem 342 and/or elsewhere in the passage. In a straight connector, 104-ST or 104-ST-90, each leg 344 may be considered to have a longitudinal end 347 at the opening 345 and a longitudinal end 346 at the stem 342; alternatively, each leg 344 may be considered to have only a single longitudinal end 347 at the opening 345 and no longitudinal end at the stem 342 (accordingly, reference numerals 346 in FIGS. 5 and 6 are shown in parentheses).

Figure 7:
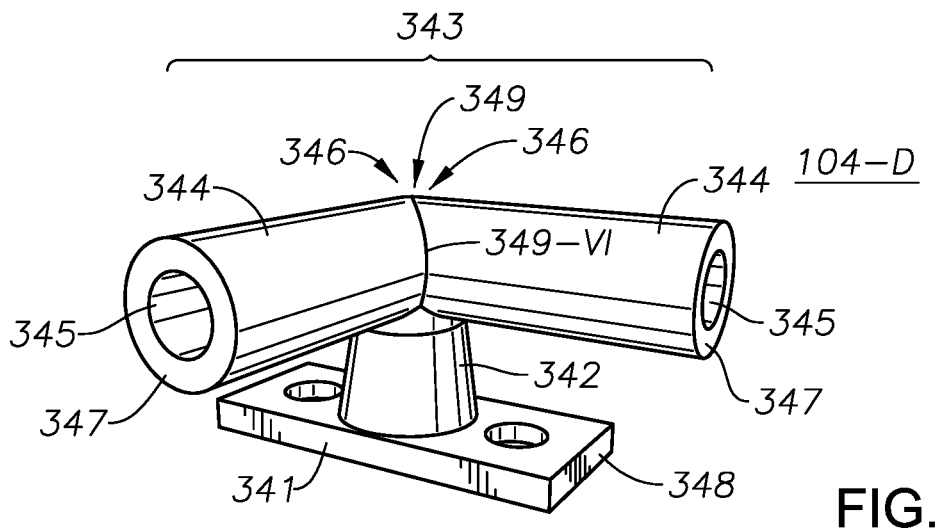
FIG. 7 is a three-dimensional perspective view of a elbow (D) connector, for use in a wire management system, in accordance with some disclosed embodiments.
Figure 8:
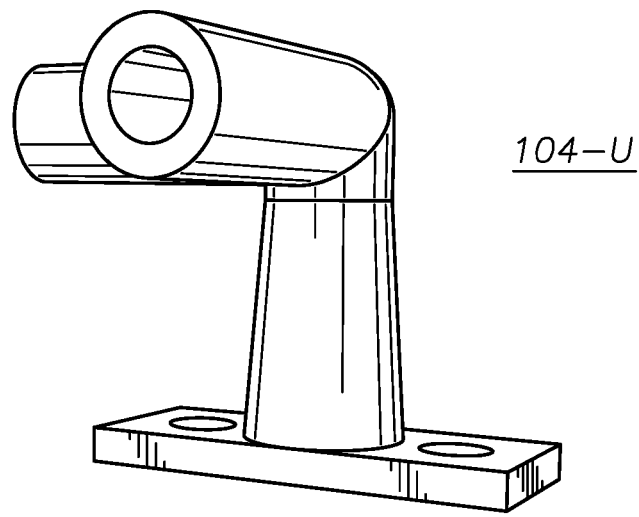
FIG. 8 is a three-dimensional perspective view of a elbow (U) connector, for use in a wire management system, in accordance with some disclosed embodiments.
Figure 17:
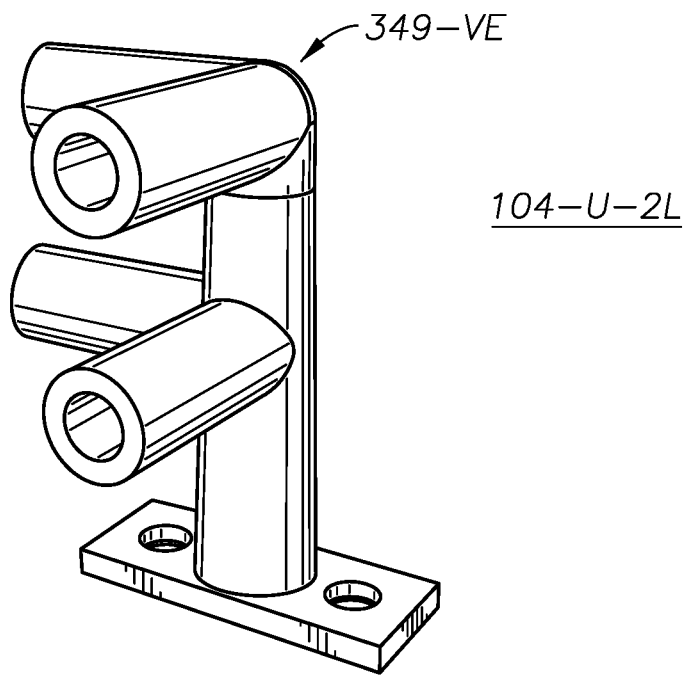
FIG. 17 is a three-dimensional perspective view of a double-level elbow (U-2L) connector, for use in a wire management system, in accordance with some disclosed embodiments.

Each of FIGS. 7 and 8 shows an elbow, or L-shaped, connector 104. An elbow connector 104 is a connector 104 that has a connecting portion 343 that has, at a given height above the base 101, two legs 344, and the two legs 344 meet or intersect with each other at an angle of 90 degrees. The point at which the two legs 344 meet or intersect (which is at the stem 342) may be referred to as the vertex 349. More specifically, we will refer to looking at the vertex 349 from 'inside' the L-shape as looking at the interior vertex 349-VI (FIG. 7) and looking at the vertex 349 from 'outside' the L-shape as looking at the exterior vertex 349-VE (FIG. 17).

FIG. 7 shows an elbow connector 104-D in which, when looking at the interior vertex 349-VI, the leg 344 shown at right is longitudinally aligned with (parallel to) the mounting portion 341 and the leg 344 shown at left is perpendicular to the mounting portion 341; this connector type may be referred to as D. FIG. 8 shows an elbow connector 104-U. In FIG. 8, the interior vertex 349-VI is not visible, but one may visualize it based on FIG. 7, since elbow connector 104-U may be understood as elbow connector 104-D rotated by 90 degrees. Thus, in FIG. 8, if one were to imagine looking at the interior vertex 349-VI, the leg 344 shown at left would be longitudinally aligned with (parallel to) the mounting portion 341 and the leg 344 shown at right would be perpendicular to the mounting portion 341; this connector type may be referred to as U.

Figure 9:
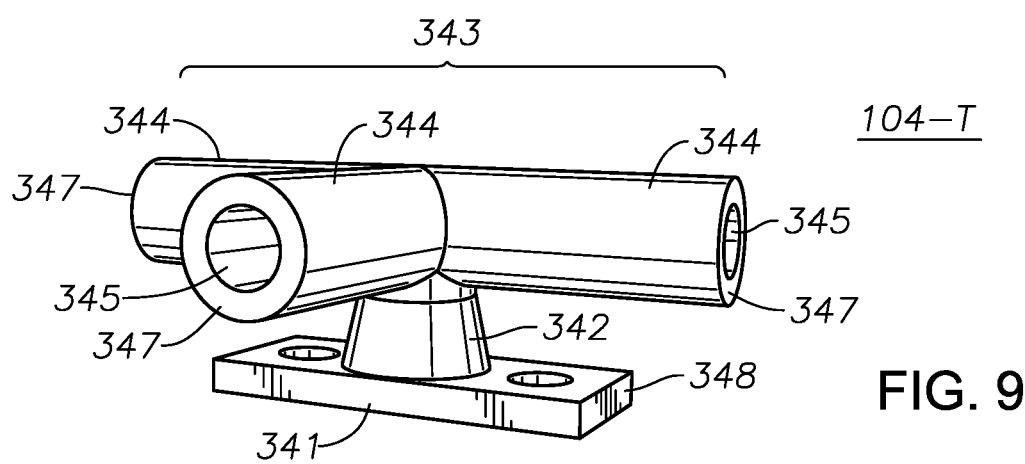
FIG. 9 is a three-dimensional perspective view of a parallel tee (T) connector, for use in a wire management system, in accordance with some disclosed embodiments.
Figure 10:
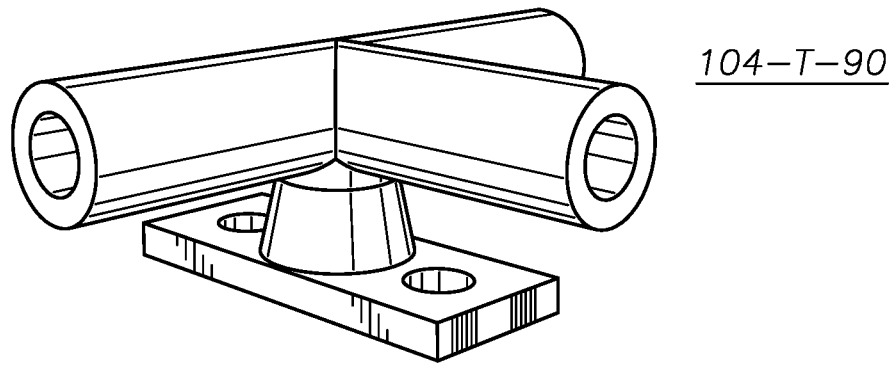
FIG. 10 is a three-dimensional perspective view of a perpendicular tee (T-90) connector, for use in a wire management system, in accordance with some disclosed embodiments.

Each of FIGS. 9 and 10 shows a tee, or T-shaped, connector 104. A tee connector 104-T or 104-T-90 is a connector 104 that has a connecting portion 343 that has, at a given height above the base 101, three legs 344, which collectively form the shape of a letter T. Thus, two legs 344 meet or intersect with each other at an angle of 180 degrees (forming the horizontal top crossbar of the letter T), and a third leg 344 meets or intersects with the other two legs 344 at an angle of 90 degrees (forming the vertical bar or stem of the letter T) (here "horizontal" and "vertical" refer to a letter T as written, not to the illustrated connectors 104-T and 104-T-90).

FIG. 9 shows a tee connector where two legs 344 (forming the T crossbar) are longitudinally aligned with (parallel to) the mounting portion 341, and one leg 344 (forming the T vertical stem) extends perpendicularly to the longitudinal extent of the mounting portion 341; this connector type may be referred to as T. FIG. 10 shows a tee connector where two legs 344 (forming the T crossbar) are perpendicular to the longitudinal extent of the mounting portion 341, and one leg 344 (forming the T vertical stem) is longitudinally aligned with (parallel to) the mounting portion 341; this connector type may be referred to as T-90.

Figure 11:
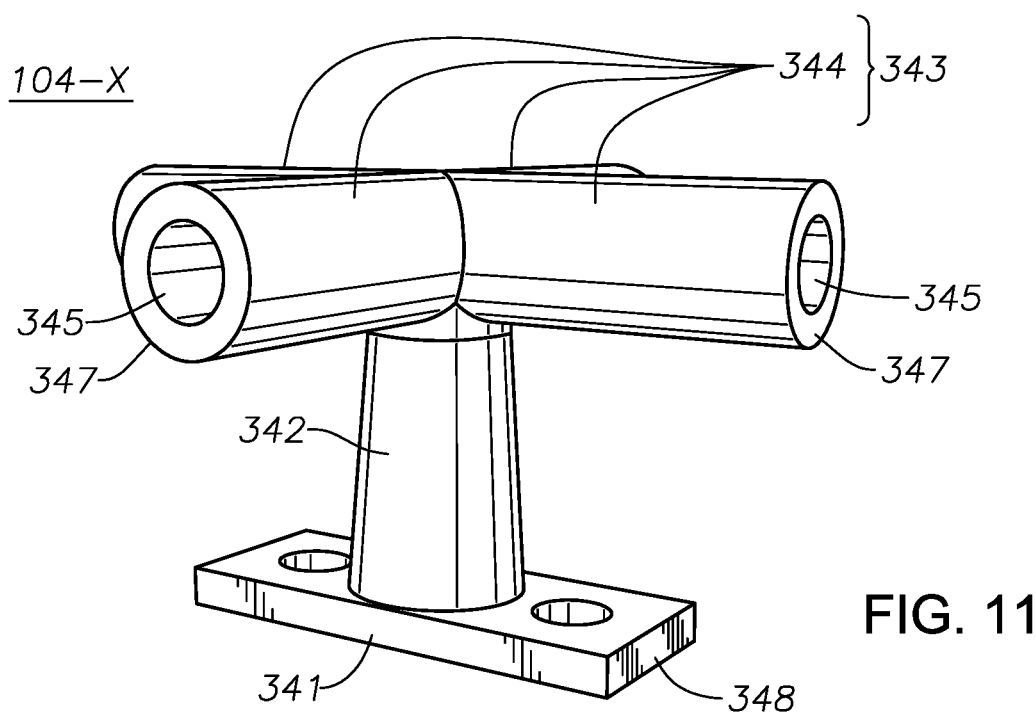
FIG. 11 is a three-dimensional perspective view of a four-way (X) connector, for use in a wire management system, in accordance with some disclosed embodiments.

FIG. 11 shows an X connector (which may also be called a four-way connector) 104-X. An X connector is a connector 104 that has a connecting portion 343 that has, at a given height above the base 101, four legs 344, which form the shape of a plus sign or a letter X (in FIG. 11, the two legs 344 in the background are visible to only a small degree). Thus, any two adjacent ones of legs 344 meet or intersect with each other at an angle of 90 degrees, and any two non-adjacent ones of legs 344 meet or intersect with each other at an angle of 180 degrees. A pair of non-adjacent legs 344 are longitudinally aligned with (parallel to) the mounting portion 341, and the other two legs 344 extend perpendicularly to the longitudinal extent of the mounting portion 341. As is self-evident from the design, there is only a single X connector 104-X; there is no distinct X-90 connector that is shifted by 90 degrees from an X connector 104-X. The connecting portion 343 of an X connector 104-X may be imagined as being formed of a combination of a connecting portion 343 of an ST connector 104-ST and a connecting portion 343 of an ST-90 connector 104-ST-90 (shown in FIGS. 5 and 6, respectively), combined at their respective longitudinal centers and such that they are perpendicular to one another.

The connectors 104 illustrated in FIGS. 3-11 are all single-level connectors 104. A single-level connector 104 is a connector 104 whose leg(s) 344 are all (is) at a single level or height (extent in the z direction) relative to the base 101 (or relative to the mounting portion 341). FIGS. 12-20 illustrate double-level (also referred to as 2-L) connectors 104 of the same types (E, ST, D, U, T, X and, where applicable, their -90 variants) as shown in FIGS. 3-11. A double-level connector 104 has two sets of legs 344, each disposed at a different respective level or height (extent in the z direction) relative to the base 101 (or relative to the mounting portion 341). That is, one set of legs 344 meets or intersects with the stem 342 at a first height (lower height) H1 relative to the base 101 and the other set of legs 344 meets or intersects with the stem 342 at a second height (higher height) H2 relative to the base 101, the second height being different from the first height. (See, e.g., FIG. 12; the dotted lines at heights H1 and H2 indicate the central longitudinal axes of the respective legs 344/openings 345. These dotted lines and the x axis are all parallel with one another, even though the perspective of FIG. 12 makes it appear as if these lines diverge from one another as they extend toward the foreground/rightward.) By virtue of these two sets of legs 344 at these two different heights, the double-level connector 104 is attachable to respective extension members 102 at these two different heights, respectively. In the embodiments illustrated in FIGS. 12-20, for each type of double-level connector 104 (E, ST, D, U, T, X and, where applicable, their -90 variants), the two sets of legs 344 are identical, that is, each set has the same number of legs 344, and the legs 344 in one set have the same respective positions in the x-y plane as the legs 344 in the other set. Since the two sets of legs 344 are identical, the corresponding respective extension members 102 that would be connected to the respective two sets of legs 344 extend in the same respective directions in the x-y plane. That is, an extension member 102 connected to a leg 344 in one set of legs 344 (i.e., at the first height) and another extension member 102 connected to the corresponding leg 344 in the other set of legs 344 (i.e., at the second height) extend in the same direction—and, assuming the lengths of the two extension members are the same, are located in same location—in the x-y plane. A leg 344 in the first set is said to "correspond" to a leg 344 in the second set if the two legs 344 are located in the same position in the x-y plane. The discussion in this paragraph has stated that a double-level connector 104 has "two sets of legs 344." It is to be understood that a "set of legs" 344 may include one or more legs 344. For example, in a double-level E connector 104, each of the two sets of legs 344 includes only a single leg 344 (FIGS. 12 and 13); in a double-level ST connector 104, each of the two sets of legs 344 has two legs 344 (FIGS. 14 and 15); in a double-level T connector 104, each of the two sets of legs 344 has three legs 344 (FIGS. 18 and 19); in a double-level X connector 104, each of the two sets of legs 344 has four legs 344 (FIG. 20), and so on. Unless indicated to the contrary, a double-level connector 104 may be understood as having two connecting portions 343, each comprising a respective set of legs 344, or alternatively, as having a single connection portion 343 (as suggested by the reference numeral in FIG. 12), comprising both sets of legs 344. Unless indicated to the contrary, in a double-level connector 104, stem 342 may be understood as extending from mounting portion 341 to the lower set of legs 344, or from mounting portion 341 to the upper set of legs 344; the portion of the stem 342 that (on the latter understanding) extends from the lower set of legs 344 to the upper set of legs 344 may (according to the former understanding) be deemed a portion of the connection portion(s) 343.

Figure 12:
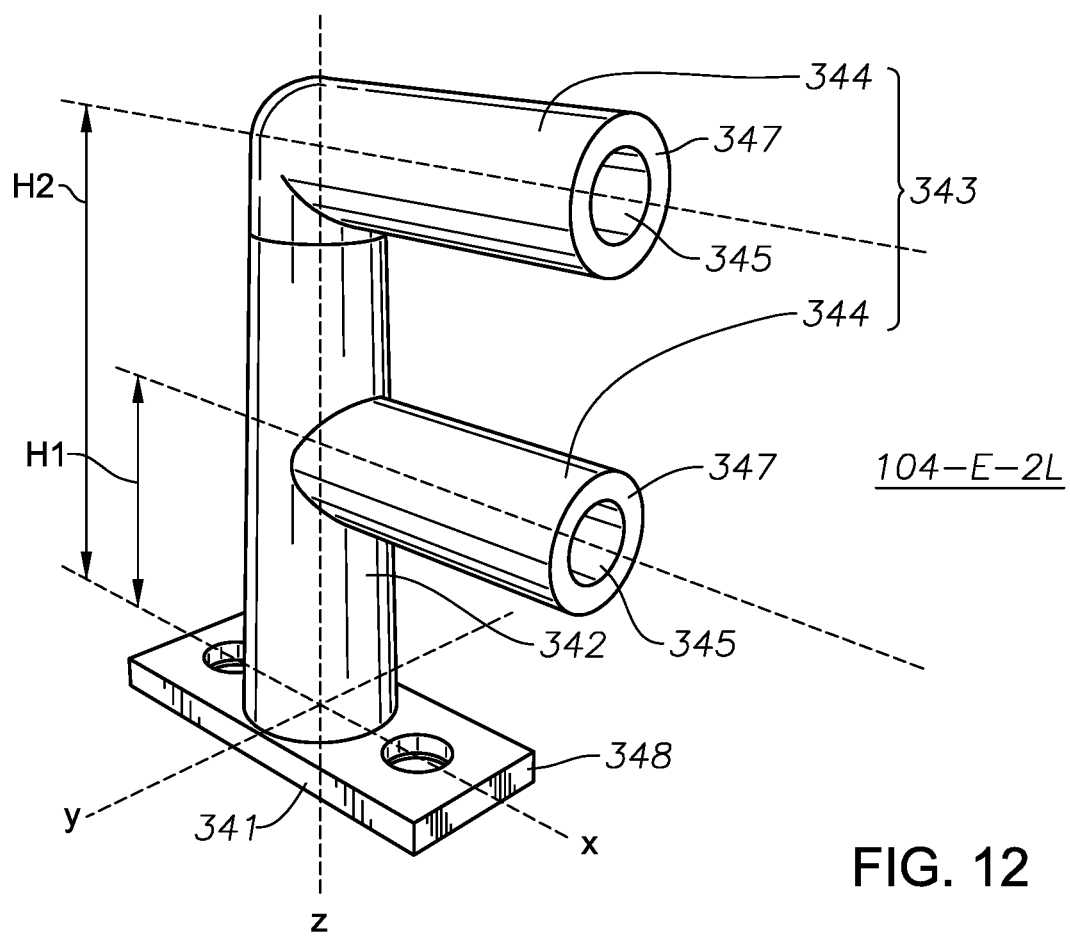
FIG. 12 is a three-dimensional perspective view of a double-level parallel end (E-2L) connector, for use in a wire management system, in accordance with some disclosed embodiments.
Figure 13:
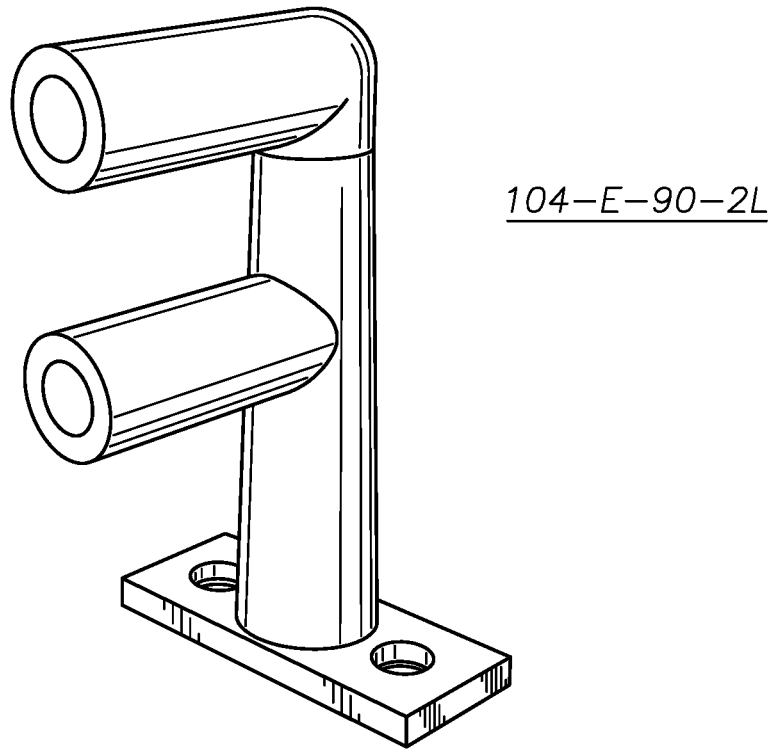
FIG. 13 is a three-dimensional perspective view of a double-level perpendicular end (E-90-2L) connector, for use in a wire management system, in accordance with some disclosed embodiments.
Figure 14:
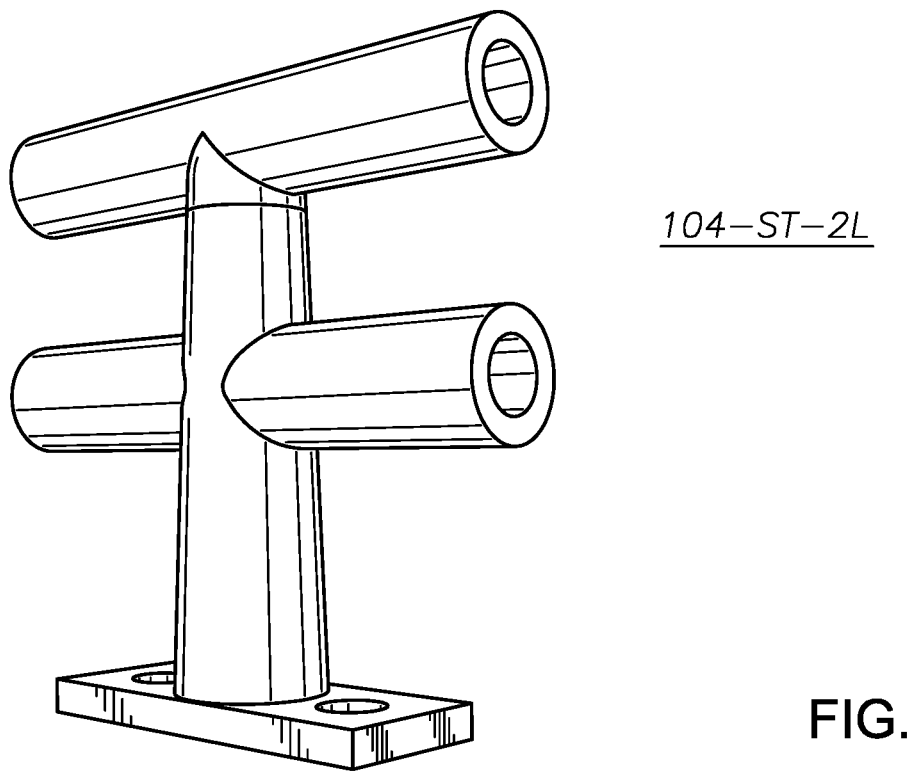
FIG. 14 is a three-dimensional perspective view of a double-level parallel straight (ST-2L) connector, for use in a wire management system, in accordance with some disclosed embodiments.
Figure 15:
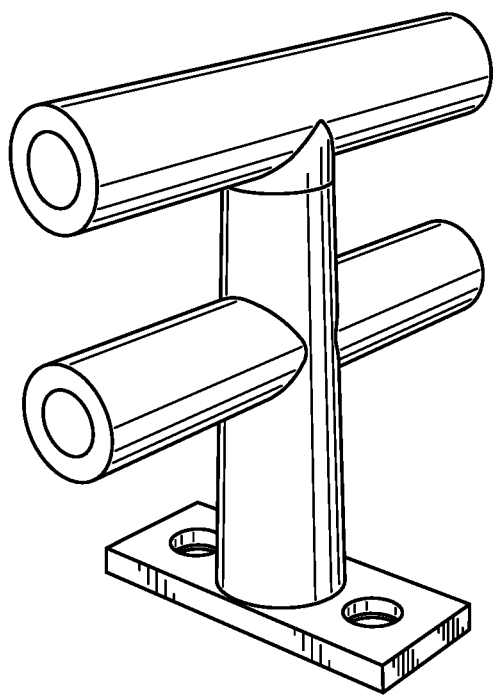
FIG. 15 is a three-dimensional perspective view of a double-level perpendicular straight (ST-90-2L) connector, for use in a wire management system, in accordance with some disclosed embodiments.
Figure 16:
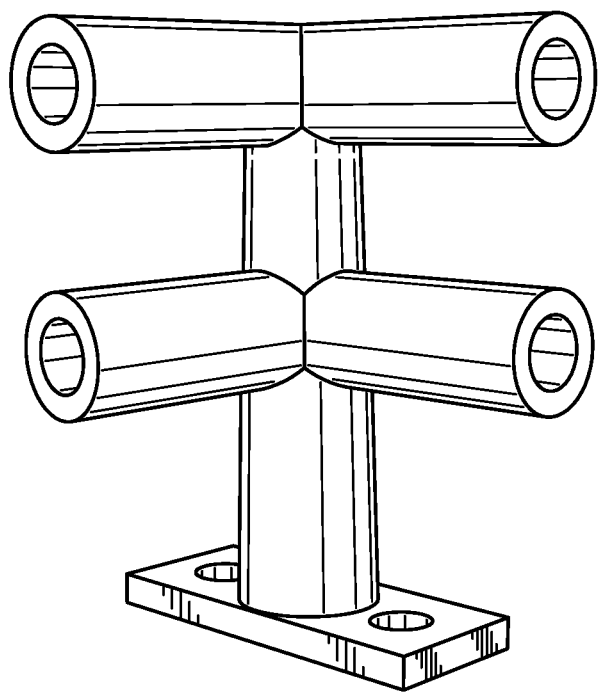
FIG. 16 is a three-dimensional perspective view of a double-level elbow (D-2L) connector, for use in a wire management system, in accordance with some disclosed embodiments.
Figure 18:
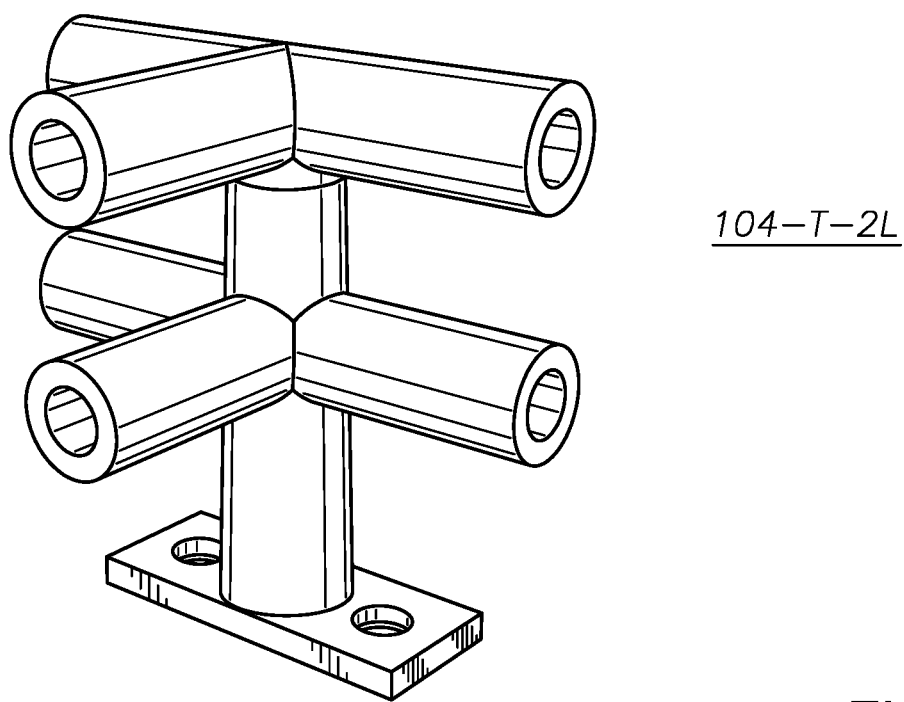
FIG. 18 is a three-dimensional perspective view of a double-level parallel tee (T-2L) connector, for use in a wire management system, in accordance with some disclosed embodiments.
Figure 19:
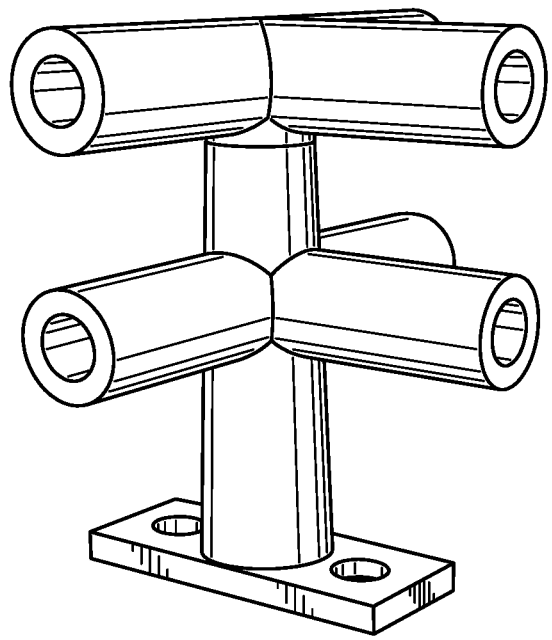
FIG. 19 is a three-dimensional perspective view of a double-level perpendicular tee (T-90-2L) connector, for use in a wire management system, in accordance with some disclosed embodiments.
Figure 20:
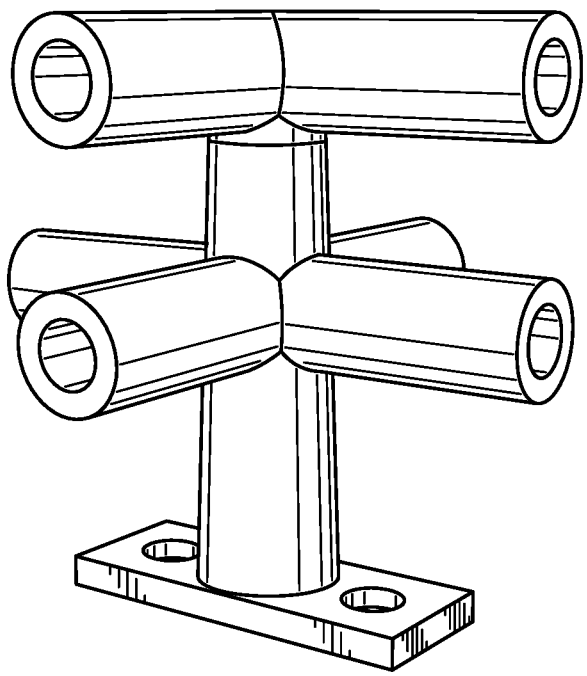
FIG. 20 is a three-dimensional perspective view of a double-level four-way (X-2L) connector, for use in a wire management system, in accordance with some disclosed embodiments.

Each of FIGS. 12-20 illustrates a different type of double-level connector 104. Specifically, FIG. 12 illustrates a double-level E connector 104-E-2L, FIG. 13 illustrates a double-level E-90 connector 104-E-90-2L, FIG. 14 illustrates a double-level ST connector 104-ST-2L, FIG. 15 illustrates a double-level ST-90 connector 104-ST-90-2L, FIG. 16 illustrates a double-level D connector 104-D-2L, FIG. 17 illustrates a double-level U connector 104-U-2L, FIG. 18 illustrates a double-level T connector 104-T-2L, FIG. 19 illustrates a double-level T-90 connector 104-T-90-2L, and FIG. 20 illustrates a double-level X connector 104-X-2L (due to the perspective of FIG. 20, only at the lower level can all four legs 344 of the X connector 104-X-2L be seen; at the higher level, only the two legs 344 in the foreground of the illustration are visible). In view of the corresponding nature of the two sets of legs 344 in a double-level connector, and in view of the corresponding nature of the single-level and double-level connectors of the same kind (e.g., of connectors 104-E and 104-E-2L), the same reference numerals and characters as used in FIGS. 3-12 are generally applicable to FIGS. 13-20. For simplicity, those reference numerals are generally omitted in FIGS. 13-20.

In some embodiments (not illustrated), connectors 104 may have more than two levels of legs 344. In some embodiments, for connectors 104 with legs 344 at two or more different levels, the legs 344 at one level may be disposed at the same and/or different positions in the x-y plane or at different orientations compared to the legs 344 at another level. Other variations are also possible, as will be appreciated by one of ordinary skill in the art.

Figure 21:
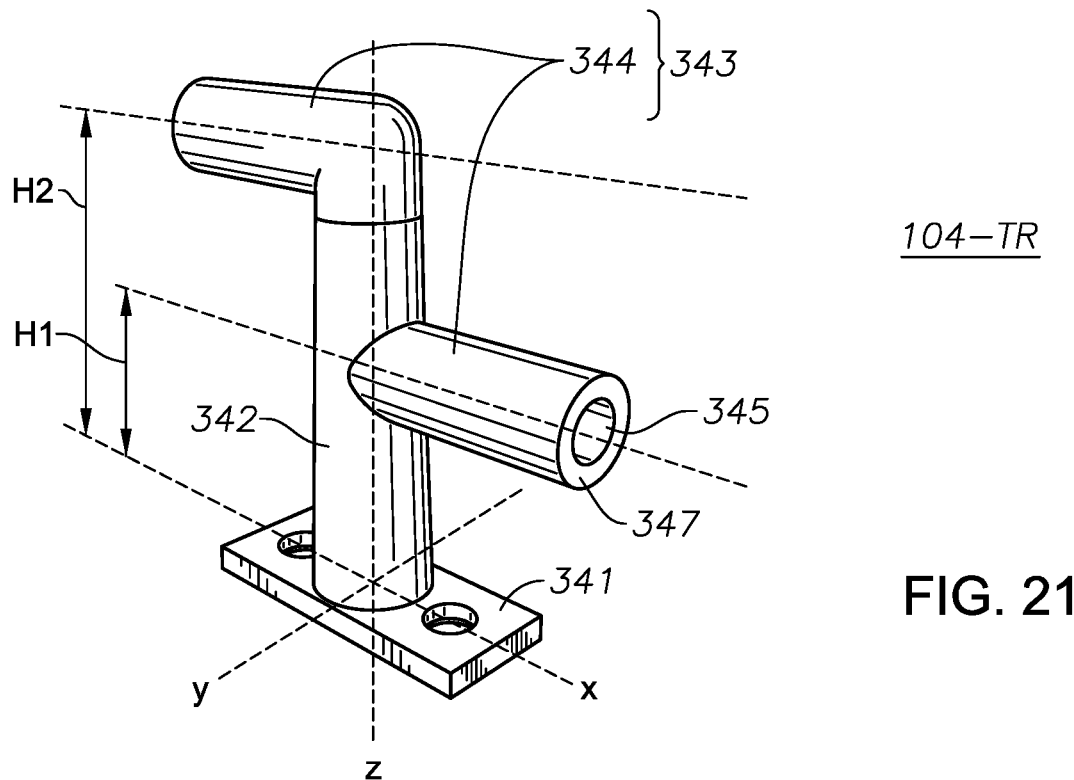
FIG. 21 is a three-dimensional perspective view of a parallel transition (TR) connector, for use in a wire management system, in accordance with some disclosed embodiments.
Figure 22:
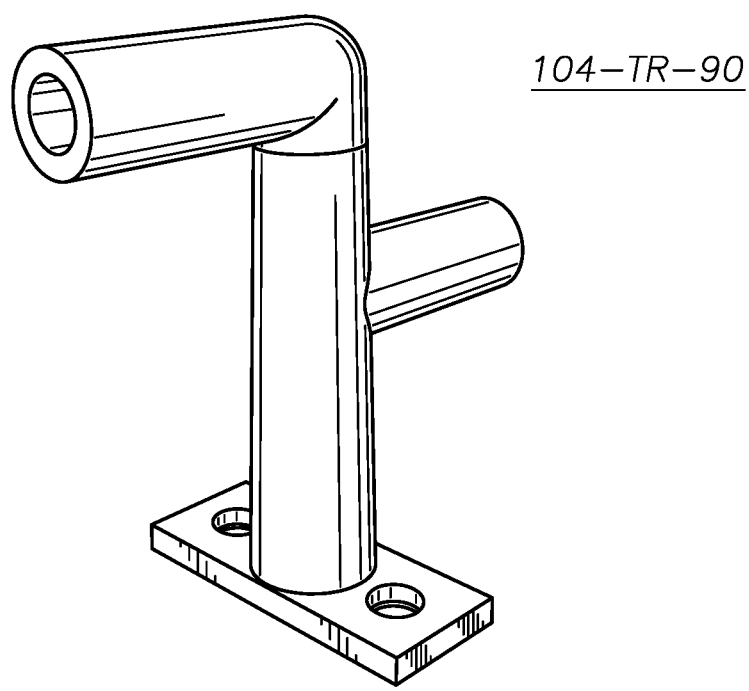
FIG. 22 is a three-dimensional perspective view of a perpendicular transition (TR-90) connector, for use in a wire management system, in accordance with some disclosed embodiments.

Each of FIGS. 21 and 22 shows a transition connector (also called a split-level connector) 104. Transition connectors are referred to as TR or TR-90 (explained below). A transition connector may be thought of as a special case of a double-level connector. As illustrated, a transition connector may have two legs 344, disposed at different heights relative to the base 101 (lower height H1 and higher height H2), but the legs 344 do not have the same respective positions in the x-y plane. (As with FIG. 12, so too in FIG. 21 the dotted lines at heights H1 and H2 indicate the central longitudinal axes of the two respective legs 344/openings 345. These dotted lines and the x axis are all parallel with one another, even though the perspective of FIG. 21 makes it appear as if these lines diverge from one another as they extend toward the foreground/rightward.) Since the two legs 344 are offset in the z or height direction, they do not meet or intersect with each other. (In contrast, the legs 344 in the single-level E, ST, D, U, T and X connectors, and the legs 344 at any given level in any of their double-level counterparts, do meet or intersect with each other). Nonetheless, in a transition connector the two legs 344 are aligned with each other like the two legs 344 of a straight connector such that, when viewed by an observer looking down onto the stem 342 in the (negative) z direction or up onto the stem 342 in the (positive) z direction, the legs 344 would appear to meet at an angle of 180 degrees, forming a straight line in the x direction (connector 104-TR, FIG. 21) or in the y direction (connector 104-TR-90, FIG. 22). The two legs 344 of the transition connector 104-TR or 104-TR-90 thus connect to two different extension members 102 at different heights, the two different extension members 102 extending in opposite directions away from the stem portion 342 of the transition connector 104-TR or 104-TR-90. These opposite directions are the positive and negative x directions in the case of the connector 104-TR or the positive and negative y directions in the case of the connector 104-TR-90.

FIG. 21 shows a transition connector 104-TR, in which the legs 344 are longitudinally aligned with (parallel to) the mounting portion 341; this connector type is referred to as TR. FIG. 22 shows a transition connector 104-TR-90, in which the legs 344 are perpendicular to the mounting portion 341; this connector type is referred to as TR-90. The extensions of the legs 344 in a transition connector are analogous to the above-described extensions of legs 344 in a straight connector. However, since the legs 344 in a transition connector are offset in terms of height, unlike a straight connector, the legs 344 in a transition connector do not meet with each other and cannot form a single, straight, hollow, pipe-like structure having a single longitudinal axis throughout its length.

Like the double-level connectors shown in FIGS. 12-20, the transition connectors 104-TR and/or 104-TR-90 may serve to implement frameworks or configurations having different levels, as is self-evident from their design shown in the figures and their description herein. The term "multi-level connector" may be used to refer to a double-level connector, a transition connector, or a connector having more than two levels.

As mentioned, a transition connector may be understood as a special case of a double-level connector. As mentioned, a double-level connector may be understood as having two sets of legs 344, one set at one height (H1) and the other set at another height (H2), where a "set" of legs may include one or more legs. So too, a transition connector may be understood as having two sets of legs 344, one set at height H1 and the other set at height H2. In the case of the transition connectors shown in the embodiments illustrated in this disclosure, each set of legs 344 has only a single leg 344; and H1 and H2 in the case of the (e.g., illustrated) transition connectors (see FIG. 21) may but need not be equal to H1 and H2 in the case of the (e.g., illustrated) double-level connectors (see FIG. 12). With this context, it may be said that, as was described for the double-level connectors, so too for the transition connectors: unless indicated to the contrary, a transition connector 104 may be understood as having two connecting portions 343, each comprising a respective set of legs 344, or alternatively, as having a single connection portion 343 (as suggested by the reference numeral in FIG. 21), comprising both sets of legs 344. Unless indicated to the contrary, in a transition connector 104, stem 342 may be understood as extending from mounting portion 341 to the lower set of legs 344, or from mounting portion 341 to the upper set of legs 344; the portion of the stem 342 that (on the latter understanding) extends from the lower set of legs 344 to the upper set of legs 344 may (according to the former understanding) be deemed a portion of the connection portion(s) 343.

In various embodiments, transition connectors may have one or more of the following features: additional levels (heights) at which legs are disposed; more than one leg at each of one or more levels; more than two legs, disposed at two or more different heights; two or more legs located, disposed, and/or extending in the same and/or different positions, orientations and/or directions in the x-y plane; one or more additional legs (levels) located at position(s) on the z (height) axis other than those illustrated (viz., H1 and H2); one or more distances in the z (height) direction between levels (legs) other than the z direction distances illustrated; and other variations, as will be appreciated by one of ordinary skill in the art.

Some of the single-level connectors 104 shown in FIGS. 3-11 appear to have legs 344 at different heights. For example, legs 344 in FIGS. 3 and 4 appear higher than legs 344 in FIGS. 5 and 6. It should be recalled that the figures are not necessarily drawn to scale, so these apparently different heights do not necessarily indicate different heights. In some embodiments that do not include double-level connectors, transition connectors, or other multi-level connectors, system 100 employs connectors 104 all of whose legs 344 are disposed at the same height, so that extension members 102 may be inserted into connectors 104 without extension members 102 being tilted upward or downward (i.e., angled relative to the x-y plane) between two connectors 104. In other embodiments that do not include double-level connectors, transition connectors, or other multi-level connectors, system 100 employs connectors 104 not all of whose legs 344 are disposed at the same height. In some embodiments that do include double-level connectors, transition connectors, and/or other multi-level connectors, system 100 employs, for any given one of the levels, connectors 104 all of whose legs 344 are disposed at the same height. For example, in a two-level configuration or system 100, the double level connectors and the transition connectors may have all lower level legs 344 disposed at a uniform height H1 and all higher level legs 344 disposed at a uniform height H2, where H1 and H2 are relative to base 101 (or relative to (e.g., top surface of) mounting portion 341). In other embodiments that do include double-level connectors, transition connectors, and/or other multi-level connectors, system 100 may employ, for any given one of the levels, connectors 104 not all of whose legs 344 are disposed at the same height.

In some embodiments that include double-level connectors and/or transition connectors, system 100 may employ some single-level connectors 104 that have legs 344 at one height, matching the lower height H1 of (lower legs 344 of a) double-level or transition connector 104, and other single-level connectors 104 that have legs 344 at another height, matching the higher height H2 of (higher legs 344 of a) a double-level or transition connector 104. Of course, for a system employing multi-level connectors that have more than two levels (of legs 344), more than two kinds (levels) of single-level connectors 104 may be used: e.g., a first kind of single-level connectors 104 that have legs 344 at a first level, a second kind of single-level connectors 104 that have legs 344 at a second level, a third kind of single-level connectors 104 that have legs 344 at a third level, and so on, as needed. Thus, a system 100 may include a variety of single-level connectors 104 having legs 344 at different heights. For example, a system 100 may employ a first set of single-level connectors 104 whose legs 344 are at a height of 11 mm relative to the base 101, a second set of single-level connectors 104 whose legs 344 are at a height of 34 mm relative to the base 101, and a third set of single-level connectors 104 whose legs 344 are at a height of 69 mm relative to the base 101. Furthermore, a multi-level system (a system having different levels of wire routing paths) may be implemented without using multi-level connectors, but rather by using different height single-level connectors 104, such as described in the example given in the preceding sentence. Thus, multi-level functionality (different levels of wire routing paths) may be achieved with or without use of multi-level connectors.

Further, in some embodiments, a system may include connectors 104 having legs 344 that do not lie in a plane parallel to the x-y plane but may be angled or tilted relative to the x-y plane. For example, an extension member 102 joined by two such angled legs 344 may be angled relative to the x-y plane, so as to extend from (at one end of the extension member 102) a first angled leg 344 joining stem 342 at height H1 to (at the other end of the extension member 102) a second angled leg 344 joining stem 342 at height H2. In this example, first angled leg 344 is angled upward toward second angled leg 344, and second angled leg 344 is angled downward toward first angled leg 344.

The use of multiple levels for routing and managing wires provides for enhanced organization, safety, efficiency (e.g., saving of space on the base 101), and ease of use. For example, a double-level configuration (e.g., using double-level connectors) may permit two bundles 103 of wires 105 to be routed along the same path as defined in the x-y plane but nonetheless to be kept physically separated from one another in the z direction. Such separation may be desired or required for safety purposes where the two bundles 103 of wires 105 are of different voltages. Such separation may also be desired or required to protect a high performance cable or the like. The ability to route these two bundles 103 (cables, etc.) along the same path in the x-y plane saves available 'real estate' or space on the base 101.

It will be noted that a system 100 may include a variety of double-level connectors 104, which collectively have legs 344 at different levels from one another, e.g., a first group of double-level connectors 104 having legs 344 at heights H1 and H2 and a second group of double-level connectors 104 having legs 344 at heights H1 and H3, or a first group having legs 344 at heights H1 and H2 and a second group having legs 344 at heights H3 and H4, etc., where H1, H2, H3 and H4 are all different heights. One of ordinary skill in the art will appreciate that other variations on this theme are possible, e.g., involving connectors having more than two levels, etc.

The "level" or "height" (e.g., of the legs 344) discussed herein may also be referred to as the "distance" (in the z direction) from the base 101 or from the mounting portion 341 (e.g., from the top or the bottom of the mounting portion 341). Although the terms "level," "height," and the like may be used herein without qualification (i.e., without explicit indication of their relative character), it is to be understood that these are relative terms, specifically, relative to the base 101 or mounting portion 341 (e.g., the top or the bottom of the mounting portion 341).

The provision of both parallel and perpendicular variants of connectors 104, that is, of both E and E-90 connectors, D and U connectors, ST and ST-90 connectors, T and T-90 connectors, and TR and TR-90 connectors, rather than just E, D, ST, T, and TR connectors, provides enhanced flexibility. In some cases, it will be inconvenient, infeasible, or unaesthetic to use the one (e.g., T) rather than the other (e.g., T-90), and hence expanded flexibility is afforded by the provision of these variants. For example, a user may be obliged to use a specific pre-existing base 101, and it may be necessary, convenient, or desirable to use a particular variant (e.g., T) rather than the other variant (e.g. T-90) to accommodate the system configuration that is needed, desired, or suitable for the wire routing needed. Such a case is seen in FIG. 1, where the base 101 includes a pre-existing support bar 115 and, at top center (position 117) in the figure, a T connector rather than a T-90 connector is preferred. (If a T-90 connector were used in this case, one leg 344 of the connector would extend beyond the support bar 115 (i.e., in the figure, above the support bar 115), approaching the axis 118 of rotation of the door (base 101), which extends through hinges 119, and this could interfere with the opening and closing of the door.) The '-90' variants may be referred to as perpendicular connectors 104 and the 'non-90' variants may be referred to as parallel connectors 104. That is, an E connector 104 may be referred to as a parallel end connector 104 while an E-90 connector 104 may be referred to as a perpendicular end connector 104; an ST connector 104 may be referred to as a parallel straight connector 104 while an ST-90 connector 104 may be referred to as a perpendicular straight connector 104, and a T connector 104 may be referred to as a parallel tee connector 104 while a T-90 connector 104 may be referred to as a perpendicular tee connector 104. As will be understood from the description herein, the terms "parallel" and "perpendicular" do not apply straightforwardly to D, U and X connectors.

Figure 23:
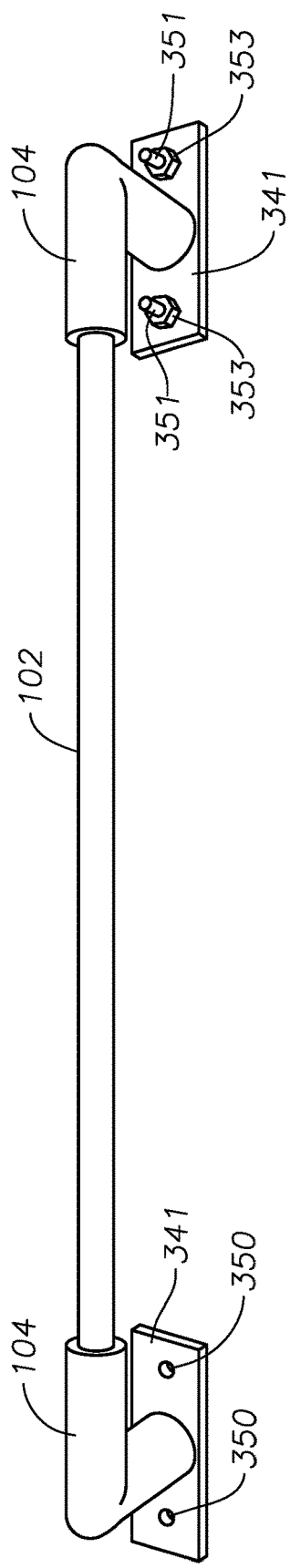
FIG. 23 is a three-dimensional perspective view of an extension member connected to respective connectors at both longitudinal ends of the extension member, used as an example of constructing or assembling a wire management system, in accordance with some disclosed embodiments.
Figure 24:
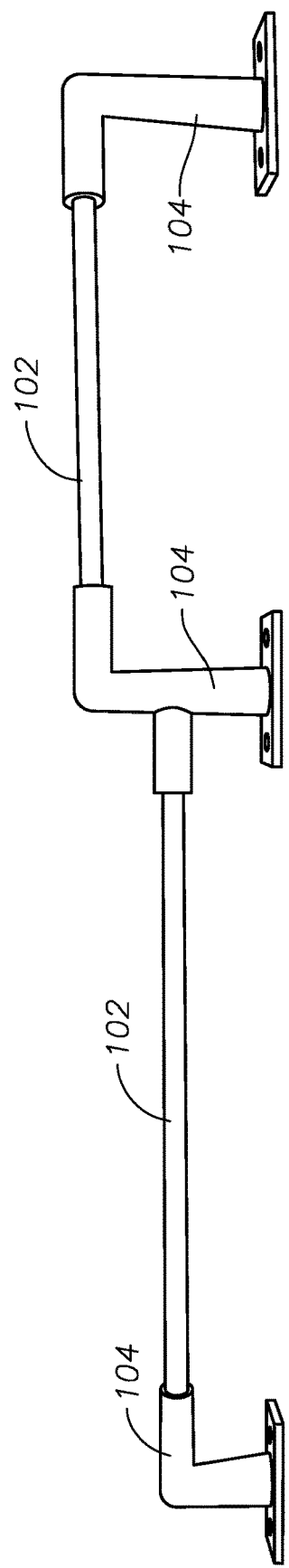
FIG. 24 is a three-dimensional perspective view of two extension members connected together via a connector (the extension members also being connected to other respective connectors at their other ends), used as another example of constructing or assembling a wire management system, in accordance with some disclosed embodiments.

The basic construction or assembling and disassembling of a configuration or framework of modular wire management system 100 will now be described with reference to FIGS. 23 and 24 and preceding figures. A configuration or setup of a modular wire management system 100 is created or assembled by connecting extension members 102 and connectors 104. As discussed, two separate (unconnected) individual extension members are shown in FIG. 2, and separate (unconnected) individual connectors 104 are shown in FIGS. 3-22. As discussed, an extension member 102 is connected to a connector 104 at one of the longitudinal ends 212 of the extension member 102, and to another connector 104 at the other longitudinal end 212 of the extension member 102. FIG. 23 shows an example of a result of this basic operation. Such an assemblage of connector 104/extension member 102/connector 104 may be considered the most basic "configuration" (of course, the extension member 102 may be of a different length and the connectors 104 may be of different types as compared to those shown in FIG. 23); the term "configuration" is used to refer to any combination of connected elements of this extent or greater (to be viable, it is generally preferable for a configuration not to have any ends 212 of extension members 102 hanging free; all ends 212 of extension members 102 should preferably be connected to respective connectors 104.) The terms "configuration," "framework," and "setup" are used interchangeably herein.

In FIG. 23, both of the connectors 104 are end connectors 104. In contrast to FIG. 23, if one of the connectors 104 were not an end connector 104 but rather another kind of connector 104 described herein, then a second extension member 102 could be connected, at one end 212 thereof, to a leg 344 of that connector 104 other than the leg 344 already connected to an extension member 102. This second extension member 102 could be connected, at its other end 212, to a different connector 104. An example of a result of these combined operations is shown in FIG. 24. Again, in FIG. 24, the two connectors 104 at the ends of the configuration (i.e., at the left and right ends of the configuration in the figure) are end connectors 104. In contrast to FIG. 24, if one of these connectors 104 were not an end connector 104 but rather another kind of connector 104 described herein, then a third extension member 102 could be connected, at one end 212 thereof, to a leg 344 of that connector 104 other than the leg 344 already connected to an extension member 102. The third extension member 102 could be connected, at its other end 212, to yet another connector 104. (An example of a result of these combined operations is not shown.) In this way, additional extension members 102 and connectors 104 may be added to the existing configuration to increase the size/extent and complexity of the configuration, as desired/needed. Of course, assembly need not proceed as described, by always adding onto the last connected elements. For example, multiple configurations may be assembled and then combined to form larger configurations. A configuration may be disassembled, in part or in toto, by reversing the assembling process, that is, by disconnecting extension members 102 from connectors 104.

With regard to assembling and disassembling, the (longitudinal ends 212 of) extension members 102 may be attached to the (legs 344 of the connection portions 343 of the) connectors 104 in a manner that achieves secure attachment and does not permit detachment by unintended casual contact, and in a manner that is easy for a human user to attach and detach by application of manual force. As mentioned, in some embodiments, the connectors 104 may be made of plastic, rubber or the like, and the extension members 102 may be made of metal or the like, with the shape and size (area) of the leg opening 345 cross-section matched with the shape and size (area) of the extension member 102 (longitudinal end 212) cross-section for the purpose of mating insertion of the (longitudinal end 212 of) extension member 102 into the leg opening 345. In some embodiments, the (longitudinal end 212 of) extension member 102 is connected to the (leg 344 of) connector 104 by interference fit (also referred to as friction fit or press fit). As such, the leg 344 of connector 104 is resilient and undergoes a limited amount of elastic deformation when the end 212 of extension member 102 is inserted into the opening 345, and the leg 344 of connector 104 subsequently presses against the inserted end 212 of extension member 102, securely retaining it. In other embodiments, extension members and connectors may be attached to each other by other modes of attachment, such as snap fit, threaded/screw fit, magnetic, suction/vacuum, etc.—any suitable mode of attachment or fastening known to one of ordinary skill in the art. It will be understood that some modes of attachment may require modification (as compared to the illustration and description herein) of the parts that connect, that is, the ends 212 and legs 344, e.g., rendering them magnetic, threaded, etc. It will be understood that some possible modes of attachment, e.g., tying, clipping, stapling, hinge, welding/soldering/brazing, crimping, adhesive (gluing, cementing, etc.), may not be as conducive to quick and easy disassembly and reassembly as are other modes. It will be noted that the use of interference fit provides for the following conditions, which may be advantageous. First, substantially no clearance between the outer circumference (or perimeter) of end 212 of the extension member 102 and the inner circumference (or perimeter) of the leg opening 345 is required and there would generally be substantially no such clearance. Second, no mechanical mechanism is required to tighten the (leg 344 of the) connector 104 onto the (end 212 of the) extension member 102 (or vice versa) or to otherwise apply further force onto either of these two parts being connected, and no such mechanical mechanism, tightening, or application of force would generally be provided. Third, beyond the two parts being connected (viz., the (leg 344 of the) connector 104 and the (end 212 of the) extension member 102), no third element such as an additional mechanical mechanism to achieve connection (e.g., a staple, adhesive, etc.) or support or another intermediary element, is required, and no such third element would generally be provided.

The different types of connectors 104 described above serve different purposes, which are generally apparent to one of ordinary skill in the art in view of the description herein. For example, an end connector 104E or 104-E-90 generally serves to terminate a path (wire route) of the configuration. It will be understood in light of the full description given herein of all the different kinds of connectors 104 that end connectors 104 are not necessarily the only kind of connectors 104 that may be deemed to terminate or to be end points of a wire route. An elbow connector 104-D or 104-U serves to effect a 90 degree change in direction of a path. A straight connector 104-ST or 104-ST-90 serves to continue a path in the same direction. A tee connector 104-T or 104-T-90 and an X connector 104-X each establish multiple continuations (straight and turning) of paths according to their particular designs. A transition connector 104-TR or 104-TR-90 may serve to transition a bundle 103 of wires 105 from a first level to a second level, e.g., so that the bundle 103 that has been so transitioned can (by the difference in height) avoid contact or interference with another bundle 103 nearby that is being routed at the first level. A double-level (2L) connector provides for two levels of wires, whereby different bundles 103 or different wires 105 may traverse (follow along) the same path or cross the same point in the x-y plane without physically contacting or interfering with each other: thus, the bundles 103 or wires 105 at one level travel or cross over or under the bundles 103 or wires 105 at the other level. (In FIG. 25, the stem 342 of tee connector 104-T-90 indicates a location in the x-y plane where a wire route (i.e., along an extension member 102) at an upper level relative to base 101 crosses over a wire route (i.e., along an extension member 102 and connector 104-T-90) at a lower level relative to base 101, the two wire routes crossing each other perpendicularly in the x-y plane, which crossover is made possible in part by double-level connector 104-ST-90-2L.) As mentioned, such multi-level arrangements may be useful, e.g., to separate different wires of different voltages or to protect a fragile wire or cable from contact with other wires. As discussed above, such different levels of wire routes may also be provided by using different height single-level connectors 104, such as the lower height connectors 104-E and 104-U having legs 344 at lower height H1 relative to base 101 and the higher height connectors 104-E having legs 344 at higher height H2 relative to base 101, shown in FIG. 25. (It will be understood that in FIG. 25 heights H1 and H2 are relative to base 101, even though the lines defining heights H1 and H2 are drawn as extending beyond the base 101; as seen in the figure, base 101 is cut off, so only a portion of base 101 is illustrated.) The foregoing description is not necessarily an exhaustive account of the different purposes or functionalities that the various different types of connectors 104 can serve or achieve.

Figure 25:
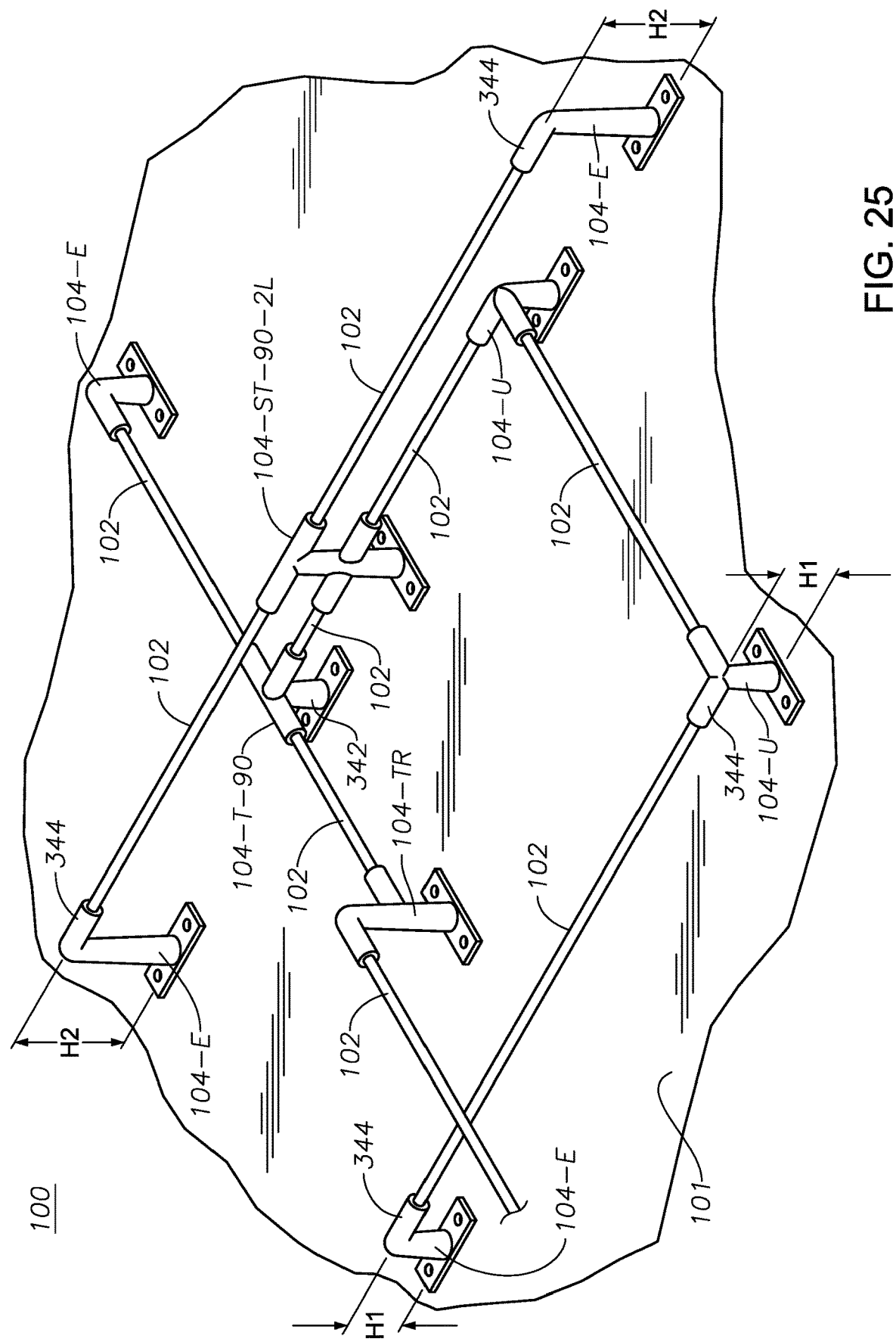
FIG. 25 is a three-dimensional perspective view of a (portion of a) wire management system, including connectors of different kinds and extension members of different lengths, in accordance with some disclosed embodiments.

Embodiments of a modular wire management system 100 described herein offer enormous versatility and flexibility, e.g., with respect to configuring and reconfiguring, or assembly, disassembly and reassembly, because of the modular nature of the system, which will be understood from the description given herein. That is, the basic components, i.e., extension members 102 and connectors 104, may be freely combined in any combination and freely separated. That is, any leg 344 of any connector 104 may be connected to any longitudinal end 212 of any extension member 102. This is made possible because the leg openings 345 may be formed with a uniform size (e.g., cross-sectional area) and shape and the longitudinal ends 212 of the extension members 102 may be formed with a (matingly) corresponding uniform size (e.g., cross-sectional area) and shape in order for the leg openings 345 to mate with the longitudinal ends 212 of the extension members 102, e.g., so as to establish an interference fit therebetween. This permits all manner of combination of connectors 104 and extension members 102, whereby innumerable combinations and configurations are possible. FIG. 25, which shows a portion of a wire management system 100, offers a small, non-limiting example of just a few of these innumerable arrangements. As seen in FIG. 25, various extension members 102 of different lengths are connected among four end connectors 104-E (two of lower height H1 and two of higher height H2), tee connector 104-T-90, double-level straight connector 104-ST-90-2L, two elbow connectors 104-U, and transition connector 104-TR.

Because of this modular nature of the system 100, which provides such enormous versatility and flexibility, it is possible to create a customized (i.e., individual, made to order) configuration at low cost. The initial configuration can be customized, and a user can tear down or modify it and continually create innumerable subsequent different customized configurations, over time, as desired or required, for example, to accommodate changes of electrical elements (to which the wiring is connected), changes in the available space (e.g., on the same or a different base 101), or reorganization of wires 105 for other reasons or purposes. All such customizations are inexpensive because all that is required is a limited number of interchangeable components (extension members 102 and connectors 104); additional ones of these components can be obtained as required. In contrast to the prior art, with the system 100 a custom-made initial configuration is not fixed and restricted in the sense that it cannot be easily modified or must be destroyed in its entirety in order to be modified. In addition, the wire management system 100 provides configurations that are secure and stable as to routing wire 105 and holding routed wire 105 in place along wire paths. In this regard, wires 105 may be securely attached to the extension members 102 and/or connectors 104, as described above. (Of course, securing members 107 may also be modular or interchangeable, as described herein, in that any securing member 107 can be used to secure any bundle 103 of wire 105 anywhere along any wire path.) In addition, the configuration formed of extension members 102 and connectors 104 may be securely held to the base 101 (by modular or interchangeable fasteners, usable with any mounting hole 350 of any mounting portion 341 of any connector 104), as described below.

With reference to FIGS. 1 and 23 and other figures, we will discuss how a modular wire management system 100 is secured to a base 101 (e.g., a surface of or associated with an industrial control panel or the like, over which surface the wires 105 are routed). As seen generally in FIGS. 3-25, the mounting portion 341 of the connector 104 has mounting holes 350 for connecting or mounting the mounting portion 341 (and thereby the connector 104 as a whole) to the base 101. Specifically, fasteners or other attachment means may be used with mounting holes 350 to mount the mounting portion 341 (and thereby the connector 104 as a whole) to the base 101. In some embodiments, mating threaded studs 351 and nuts 353 are used as the fasteners; an example of this type of fastener is illustrated in FIG. 23. As seen in FIG. 23, the connector 104 shown at right is mounted to the base 101 with a threaded stud 351 and nut 353. For the sake of illustration and comparison, the connector 104 shown at left is shown without a threaded stud and nut and is not mounted to the base 101; in an actual configuration intended for use, generally all the connectors 104 would be mounted to the base 101. To describe more specifically the mounting to the base 101 that is illustrated in FIG. 23, once the desired configuration of the entire initial system 100 is determined, threaded studs 351 would be attached to the base 101 in the appropriate positions for holding all the connectors 104 to be used. The threaded studs 351 may be attached to the base 101 by arc welding or by any other suitable method such as would be known to one of ordinary skill in the art. Each mounting portion 341 would be placed on the base 101 in the appropriate location so that a threaded stud 351, which has been, e.g., arc welded to the base 101, extends upward (in the z direction) through each of the two mounting holes 350. A threaded nut 353 (threaded in mating fashion with the threaded stud 351) is then screwed onto each threaded stud 351 in each mounting hole 350 and tightened onto the upper surface of the mounting portion 341, thereby securing the mounting portion 341 (and hence the connector 104 as a whole) to the base 101. In this way the connector 104 is fixedly, that is, substantially immovably, secured to the base 101. In some embodiments, the connector 104 may be mounted on the base 101 using other types of attachment methods and apparatuses. For example, the threaded stud 351 could be screwed into the base 101 or attached to the base 101 in another fashion. Further, a different kind of fastener or attachment apparatus or method could be used instead of threaded stud 351 and threaded nut 353, e.g., snap-fitting. In the case of snap-fitting, mounting portion 341 may be provided with an appropriate pin, flanges or the like instead of each mounting hole 350, which pin, flanges or the like may be snap-fitted into a hole (such as large holes 116 or small holes 122 in FIG. 1) provided in the base 101. Base 101 may be manufactured or later provided with a plurality of such holes for snap-fitting, in suitable number, spacing, and locations throughout base 101 (not so limited as holes 116 and 122 in FIG. 1), so that connectors 104 can be quickly and easily placed in and moved to different mounting positions (and mounted to or removed from base 101), so as to provide flexibility and versatility of assembly, disassembly, and reassembly with respect to the mounting of connectors to the base 101 and the removal of connectors from the base 101, similar in degree to the flexibility and versatility with respect to connecting, disconnecting and reconnecting connectors 104 and extension members 102, described above. Such flexibility and versatility with respect to mounting and removal of connectors to/from base 101 may also be provided by using a variant of the threaded stud and nut embodiment described above. Specifically, threaded screws not fixedly attached to base 101 may be used instead of threaded studs 351 arc welded to base 101, and a plurality of holes (as described above in the snap fitting embodiment) may be provided in base 101 for inserting the threaded screws through the holes, the holes being made use of selectively as needed/desired. Suitable additional variations of attachment apparatuses and methods may be employed, as will be understood by one of ordinary skill in the art.

In still other embodiments the connector 104 may be movably yet securely attached to the base 101, rather than fixedly (immovably) attached. For example, the base 101 may be provided with a track or the like along which the mounting portion 341 of the connector 104 slides, such that the connector 104 is slidably movable relative to the base 101, in the x or y direction. FIG. 1 shows a support bar 115 along the top of the figure (along one edge of the base 101), to which some mounting portions 341 are fixedly attached. (Part of the extension member 102 shown toward the top left of FIG. 1 has been removed in the illustration in order to show the structural detail (e.g., large holes 116, small holes 122, and slots 124) of the support bar 115 disposed underneath the extension member 102.) Such a support bar could be modified to create and provide a track within/along which the mounting portion 341 of the connector 104 may slide. For example, two walls may be provided, one on either long side of the support bar 115, extending in the right-left direction in the figure. These two walls would create a channel (track) between the two walls. A lip or flange may be provided at the top of each of the walls, along the lengths of the walls, the two lips or flanges extending in the x-y plane toward each other and toward the center of the channel formed between the two walls, for retaining the mounting portion 341 of a connector 104 in the channel. The lips or flanges would secure the mounting portion 341 to the base 101 (i.e., retain the mounting portion 341 in the track formed from the support bar 115, which is fixedly attached to the base 101) but permit the mounting portion 341 to slide along the length of the track. In this way, the connector 104 would be slidably but securely attached to the base 101. The slidability would permit easy, flexible movement of the connector 104 along the base 101 in order to place the connector 104 at a desired location. A locking mechanism could be provided that is configured to permit locking the mounting portion 341 (i.e., the connector 104) in place on the track after it has been placed in the desired location. Such a locking mechanism could be, e.g., a pair of pegs (not shown) that are fitted through the mounting holes 350 of the mounting portion 341 and into respective holes in the bottom of the track (such as the holes 116 or 122 in the support bar 115); alternatively, the pegs could simply be placed so as to abut the two longitudinal ends 348, respectively, of the mounting portion 341 and into respective holes (such as 116 or 122) in the bottom of the track, thereby preventing the mounting portion 341 (and hence the connector 104) from moving (along the track) by virtue of the pegs being fixed in place abutting each longitudinal end 348 of mounting portion 104. Other locking mechanisms could also be employed. The locking mechanism may also be configured to permit unlocking the mounting portion 341 (e.g., the pegs can be removable) to permit relocating mounting portion 341. In some embodiments, multiple tracks could be provided to permit sliding the mounting portion 341 in both the x and y directions, for example, in or similar to the manner of a plotter.

In other embodiments, the connector 104 may be movably but securely mounted to the base 101 by means of a rotating member, along the lines of a lazy Susan, that would permit the mounting portion 341 (and hence the connector 104 as a whole) to be rotated, relative to the base 101, to a desired location/orientation in the x-y plane. Again, a locking mechanism may be provided to permit locking the rotating member (or the mounting portion 341 and thereby the rotating member) in place after the mounting portion 341 (connector 104) had been rotated to the desired location/orientation. The locking mechanism may also permit unlocking of the rotating member/mounting portion 341.

The above-described apparatuses for mounting the (mounting portion 341 of the) connector 104 to the base 101, namely, the threaded stud 351 and nut 353 (or other apparatus for fixed mounting, e.g., screw and nut), the sliding track, and the rotating member, may be referred to as base-connector mounting members. Base-connector mounting members of kinds other than those described above are possible. Of course, just as the connecting of the mounting portion 341 to the base 101 connects the entire connector 104 to the base, so the connecting to the base 101 of all the mounting portions 341 of all the connectors 104 used in a given configuration causes the extension members 102 connected to those connectors 104, hence the entire framework, to be reliably and fixedly secured to the base 101.

Finally, some additional observations concerning components and features of the system 100, further variations of the system 100 and its components, and potential advantages of the system 100 will be discussed. It should be noted that (regardless of the presence or absence of language such as "in some embodiments") the following observations are not to be taken as necessarily applying universally to all embodiments, unless indicated to the contrary. It should further be noted that the following observations generally refer to an assembled configuration or system 100 and, when individual components or parts of a configuration or system 100 are described, the description thereof pertains to such components or parts as employed in an assembled configuration or system 100, even if this context is not mentioned, unless indicated otherwise.

In system 100, wires 105 may be secured solely to extension members 102 and not to connectors 104, or solely to connectors 104 and not to extension members 102, or to both extension members 102 and connectors 104. Thus, it may be said that wires 105 are secured to the wire routing members.

In the illustrated embodiments, wires 105 are held at a distance from base 101 and do not make contact with base 101, except that when wires 105 depart from the framework of connected extension members 102 and connectors 104 the wires 105 may contact the base 101 as they extend to the electrical elements to which they are connected. In some embodiments, wires 105 are always kept at a distance from base 101 and never contact base 101; this may be accomplished, e.g., if (in contrast to the embodiment shown in FIG. 1 as described above) the electrical elements are disposed on the same side of the base 101 as the wires 105, or if the holes 109 (FIG. 1) in base 101 are sufficiently large for wires 105 to pass through the holes 109 without contacting the sides of the holes 109. The retaining of wires 105 at a distance from base 101 and not in contact with base 101 may mitigate the risk of damage to the wires 105, electrical accidents, etc., which could occur if a wire 105 were to contact a sharp edge of base 101 or an electrically conductive base 101. It may be said that wires 105 are held at a distance from base 101 by the wire routing members or by the framework formed by the wire routing members.

As seen, e.g., in FIG. 1, wires 105 may be characterized as being substantially aligned with, parallel to, and extending along (all or a portion of) the length of extension members 102 in the same direction as the extension members 102 (again, it being understood that this is not the case where the wires 105 depart from the framework of connected extension members 102 and connectors 104 as they extend to the electrical elements to which they are connected). Wires 105 are routed along wire guiding elements (i.e., extension members 102 and connecting portions 343 of connectors 104) in a substantially straight manner; wires 105 do not have to wind around the wire guiding elements (e.g., in a spiral configuration), e.g., in order to be secured to the wire guiding elements. In the illustrated embodiments, wires 105 do not wind around the wire guiding elements.

As seen, e.g., in FIG. 1, wires may be characterized as being open to the ambient environment, not enclosed, covered, contained, or the like in a sheath, tunnel, cage, track, channel, etc. (Of course, it is understood that wires 105 are surrounded or encircled by securing members 107, (e.g., cable ties), but in the illustrated embodiments the securing members 107 cover the wires 105 over only a small portion of the length of the wires 105.) Relatedly, wires 105 are disposed entirely outside of extension members 102, connectors 104, and other components of the system 100; wires 105 are neither partly nor wholly disposed inside of extension members 102, connectors 104, or other components of the system 100. This manner of disposing wires 105 in an uncontained manner and outside of the wire routing members (i.e., extension members 102 and connectors 104) may facilitate easy removal, addition, repair, replacement, etc. of wires 105. It may also facilitate preventing sharp turns in the wire path. Sharp turns may increase the risk of damage, fraying, breakage, etc. of wires 105. In the assembling of the framework of extension members 102 and connectors 104, securing members 107 may be employed at appropriate or desired locations with appropriate or desired spacing therebetween so as to avoid sharp turns to the extent desired or required. The absence of a cage, track, etc. for containing the wires 105 may simplify the wire routing members (e.g., manufacture and assembly thereof), reduce their cost, and facilitate their portability and stowability (while reducing risk of damage).

Bundles 103 of wires 105, or all or some of wires 105, may be in contact with (e.g., lie directly against) extension members 102, without requiring and without there being any intermediary member disposed between wires 105 and extension member 102. In some prior art, such an intermediary member might assist in retaining wires 105 along a wire routing framework. Such an intermediary member may also extend along the entire length of a wire path, in contrast to securing members 107, which extend only along a small fraction of the length of the wire path/extension members 102/connectors 104. The absence of an intermediary member may simplify the system 100 and conserve space and materials used.

The wires 105 are not left dangling, but at least substantially lie adjacent to and follow along the path of the wire guiding elements (i.e., extension members 102 and connecting portions 343 of connectors 104) and are secured to the wire guiding elements collectively (whether to one or both of extension members 102 and connecting portions 343 of connectors 104), along the entire wire path substantially until the wires 105 reach the electrical elements to which they are connected. Such dangling could increase the risk of the wires 105 being damaged or caught on an object and disconnected from the electrical element, etc.

The wire guiding elements of system 100 (that is, the extension members 102 and the connecting portions 343 of connectors 104) do not extend away from the wires 105 significantly in the height direction. The extension members 102 and the connecting portions 343 extend only a little lower than the wires 105. Also, the securing members 107 extend only slightly higher and lower than the wires 105. The wire guiding elements of the system 100 also do not extend perpendicularly to the wire path. These aspects of the system 100 may reduce the height of the system 100 and conserve space used by the system 100. Relatedly, the system 100 does not require guideposts (to guide the wires 105 along the wire path), the guideposts extending perpendicular to the direction of the wire path, perpendicular to the direction in which the elements to which the wires 105 are secured extend, or perpendicular to the direction in which the elements along which the wires 105 are guided extend.

Relatedly, system 100 is configured to guide long lengths of wires 105 along wire guiding elements (in particular, the wires 105 are kept adjacent to the wire guiding elements along substantially the entire wire path), instead of guiding or retaining wires merely at intermittent locations, (inter) connection points or the like. This feature may secure the wires 105 better along the (entire) wire path and, like the feature of the absence of dangling wires, may mitigate the risk of wires 105 being damaged, pulled from their path, disconnected from their electrical elements, etc., which could more easily occur where wires do not follow along/adjacent a wire guiding element.

System 100 comprises various elements, among them two distinct kinds of discrete basic elements: extension members 102 and connectors 104 (collectively referred to as wire routing members). Extension members 102 and connectors 104 are joined together in alternating fashion, that is, an extension member 102 is connected to a connector 104, which in turn is connected to an extension member 102, which in turn is connected to a connector 104, and so on. This alternating configuration may be expressed by the notation A-B-A-B- . . . , where A represents an extension member 102, B represents a connector 104, and the ellipsis represents a continuing pattern. This alternating pattern is illustrated, e.g., in FIGS. 1 and 23-25. It is not the case that an extension member 102 is connected directly (i.e., without intermediary) to another extension member 102 or that a connector 104 is connected directly (i.e., without intermediary) to another connector 104. While connectors 104 connect directly (i.e., without intermediary) to base 101, extension members 102 are connected to base 101 via connectors 104 but do not connect directly (i.e., without intermediary) to base 101.

Relatedly, extension members 102 are connected to each other in an end-to-end manner, but indirectly via the connectors 104, as explained in the previous paragraph (a longitudinal end 212 of one extension member 102 is connected, via a connector 104, to a longitudinal end 212 of another extension member 102). Extension members 102 are not directly attached one to another and do not contact (touch) one another when assembled in a framework or configuration of system 100. These features may facilitate assembly and disassembly.

As seen in illustrated embodiments, in system 100, turns in the wire paths may be established by the connectors 104 (i.e., D, U, T and X connectors 104 and their -90 variants), which have legs 344 that meet at substantially right angles. (Of course, the wires 105 themselves do not need to follow a 90 degree angle turn, but can be turned at less sharp angles by placing securing members 107 at least some distance away from the 90 angle turn, as seen, e.g., with respect to turns 121 in FIG. 1; the closer the securing members 107 are to the 90 degree angle turn, i.e. to the stem 342, the sharper becomes the turn that is created in the wires 105 themselves.) In contrast to connectors 104, as seen in illustrated embodiments, extension members 102 may be straight and not effect turns. (Accordingly, the wires 105 may avoid sharp turns by generally following the extension members 102 but not completely following the right angles of the connectors 104.) These configurations or shapes of connectors 104 (involving simple straight and right angle forms) and extension members 102 (simple straight forms) may simplify manufacture and assembly. By providing connectors 104 with right-angled turns instead of turns that curve more gently/less sharply, the amount of space required by system 100 may be reduced.

Once put in place, the extension members 102 and the connectors 104 are substantially fixed in place, stable and secure. The extension members 102 and connectors 104 do not need to be moved and are not moved, nor do they have parts that need to be moved or are moved, in the process of putting the wires 105 in place on the framework formed of extension members 102 and connectors 104.

Extension members 102 and connectors 104 are interchangeable modular pieces: any connector 104 can connect to any extension member 102, and vice versa. Accordingly, it is possible to build a configuration or system 100 as large as desired, and one is not limited or constrained in this regard as one would be by using a system that has a pre-existing fixed-size configuration or base 101. Similarly, it is possible to build a configuration or system 100 as small as desired, and one will not end up with unwanted excess material of a pre-existing fixed-size configuration or base 101 not all of which is needed/used, nor will one end up with unwanted excess space occupied by a pre-existing fixed-size configuration or base 101 that is larger than needed. These problems of unwanted excess material or unwanted occupation of excess space may occur if one uses a system that (in contrast to system 100) has a pre-existing fixed-size configuration or base 101, as it is not necessarily known in advance how much space or how many repeat components will be needed to form a configuration that is able to manage and route a given set of wires.

Base 101 may be a solid extended member with substantial planar extent (e.g., flat), as contrasted with, e.g., a support bar. Base 101 may be substantially continuously solid, i.e., substantially without holes, or it may have holes 109, for example, as seen in FIG. 1, for wires 105 to travel to the electrical elements to which they are connected. The framework of interconnected extension members 102 and connectors 104 is connected directly to base 101 without any intermediary member (such as an intermediary member for supporting, securing or stabilizing the configuration or components thereof).

As described herein, extension members 102 may be longitudinal members such as bars, rods or tubes, whether hollow or solid, each configured for connection at two longitudinal ends 212 thereof to respective connectors 104. This contrasts with extension members that have a square, circular, or similar (i.e., not relatively long and thin) shape, and/or are configured for connection on many (e.g., more than 2) or all ends or sides. As described herein, a connector leg 344 is hollow, at least over a portion of its length, so as to receive a (longitudinal) end 212 of an extension member 102, which may be inserted into leg 344 via leg opening 345. Accordingly, as noted, the extension member 102, or end 212 thereof, may be understood as a male member or male connecting portion, and the connector 104, or leg 344 thereof, may be understood as a female member or female connecting portion. In system 100, the male connecting portion and the female connecting portion are configured for interconnection, by insertion of the male connecting portion (protrusion) into the female connecting portion (hole) and retention of the male connecting portion in the female connecting portion by compression of the male connecting portion by the female connecting portion (i.e., for example, by a friction or interference fit). This interconnection does not require rotating of either of the male or female connecting portion relative to the other, and it does not require changing the orientation of either the male or female connecting portion in the x-y-z space. The male connecting portion and the female connecting portion are manually connectable and disconnectable.

As understood from the description herein, in some embodiments such as illustrated in FIGS. 1 and 23-25, extension members 102 do not mount directly to or make direct contact with base 101, but rather are held at a distance (in the height direction) from base 101. Similarly, although connectors 104 are mounted directly to base 101 via mounting portion 341, the wire guiding portions of the connectors 104, that is, the connecting portions 343, do not mount directly to or make direct contact with base 101, but rather are held at a distance (in the height direction) from base 101.

As illustrated, connectors 104, in significant part (namely, their stems 342), are oriented perpendicular to extension members 102. However, the wire guiding portion of connectors 104, that is, the connecting portions 343, lie parallel to the x-y plane (as do extension members 102); and the connecting portions 343 and the particular extension members 102 that they connect with directly are substantially coincident on a line in the x-y plane (this assumes that connection portion 343 does not include the upper portion of stem 342 extending between the two legs 344—see the above discussions about the different possible interpretations of connection portion 343 in the case of double-level and transition connectors 104). (In some embodiments, not here illustrated, stems 342 need not be perpendicular to extension members 102 and connecting portions 343 need not be parallel to the x-y plane. In some embodiments, not here illustrated, neither extension members 102 nor connectors 104 need be straight along their entire length but may, e.g., include an angled turn or be curved, in which case the aforementioned connecting portions 343 and particular extension members 102 that they connect with directly may not be substantially coincident on a line in the x-y plane.)

The system 101 uses a plurality of discrete connectors 104. A connector 104 does not extend the length of an extension member 102 or the length of the entire configuration.

In the illustrated embodiments, connectors 104 do not go through or inside of the extension members 102.

Connectors 104 serve, and have specific portions for, both the function of connecting or mounting (themselves, the extension members 102, the entire framework or configuration) to the base 101 and the function of connecting extension members 102 to one another. Thus, the same component of the system 100 both mounts or secures (or more generally speaking, connects) the configuration or framework to the base 101 and connects or secures the extension members 102 together.

Connectors 104 may be formed as small, simple members, e.g., having a small number of legs 344, hence a small number of holes (leg openings 345) to hold/retain extension members 102. Connectors 104 may be formed as lightweight but sturdy members, in order for connectors 104 to be able to mount to the base 101 securely and stably and to support extension members 102 at a distance above the base 101.

As mentioned, it is possible for both extension members 102 and the legs 344 and leg openings 345 of connectors 104 to have circular cross-sections. This may simplify manufacture and use (assembly and disassembly). Compared to other shapes such as a square, a circular cross-section may reduce the risk of damage to the leg 344 that could occur in the processes of inserting extension member 102 into leg 344 and removing extension member 102 from leg 344.

As mentioned, legs 344 may meet each other at angles (in the x-y plane) other than 90 or 180 degrees. For example, analogously to the T-shaped tee connector, a Y-shaped connector could be provided. In order to receive the second ends 212 of two extension members 102 connected at their first ends 212 to the two legs of the Y-shaped connector, modified end connectors could be provided if needed, wherein the respective legs 344 thereof are neither parallel nor perpendicular to the respective mounting portions 341 thereof, but are rather disposed at an angle between the parallel and perpendicular leg orientations. Where the base 101 permits mounting in only 2 directions (e.g., the x direction and the y direction), such modified end connectors 104 could be mounted to the base 101 in the normal manner yet their legs 344 would be properly angled (unlike the parallel and perpendicular connectors) to receive the end 212 of an extension member 102 connected at its other end 212 to a Y-connector. Thus, more generally, legs 344 may be angled in the x-y plane not only relative to each other but also relative to mounting portion 341 in ways other than the ways shown in the illustrated parallel and perpendicular connectors 104. (The possibility of legs 344 being angled upward or downward relative to mounting portion 341/base 101 has already been described above.)

In some embodiments, extension members 102 do not go all the way through connectors 104, that is, it is not the case that an extension member 102 enters a connector 104 at one location on connector 104 (e.g., at one opening or at one end) and exits the connector 104 at another location on connector 104 (e.g., at another opening or at another end); rather, a portion (e.g., end 212) of extension member 102 enters or is inserted into connector 104 and does not exit the connector 104 anywhere else on connector 104; accordingly, the inserted portion (e.g., end 212) of the extension member 102 is hidden from view inside connector 104, is unexposed to the ambient environment outside of connector 104, and is unable to contact or touch items outside of connector 104.

The securing members 107 (e.g., cable ties) may completely encircle the wire bundle 103 in a direction perpendicular to the direction of the wire bundle 103/wire path/wire guiding elements (i.e., extension members 102 and connecting portions 343 of connectors 104). This complete encirclement stands in contrast to, e.g., an arrangement in which a semi-securing member encircles or surrounds the wire bundle 103 only partially, retaining the wire bundle 103 on one side of the wire bundle 103, but leaving a gap on the other side through which the wire bundle 103 could escape from the securing member. The complete encirclement provided by securing members 107 serves to reliably secure the wires 105 to the wire guiding elements.

The securing members 107 may occur at only periodic points along the wire path, not along the entire extent of the wire path.

The securing members 107 do not go inside or through (e.g., through a hole in) the extension members 102 or connectors 104. As noted, the extension members 102 and connectors 104, although they may be hollow, they may at least have a solid outer surface (like a normal pipe or tube, without holes, openings, etc. along its length, but rather having openings only at its two longitudinal ends).

In some embodiments, the securing members 107 do not contact the extension members 102 on the side (of extension members 102) where the securing members 107 contact the bundles 103 of wires 105; rather, the wires 105 lie intermediate between the securing members 107 and the extension members 102, thus precluding contact between the securing members 107 and the extension members 102 on the side of extension members 102 where the wires 105 are disposed. For example, as seen in FIG. 1, the securing members 107 do not contact the extension members 102 on the top side of the extension members 102 (the side visible to the viewer) but only on the bottom side thereof (not visible to the viewer). Further, the securing members 107 may be movable, e.g., slidable, along the wire path (along the wires 105), to different locations along the length of an extension member 102 or of a connector 104, without contacting the extension member 102 or the connector 104 on the side of extension member 102 or connector 104 where the wires 105 are disposed (the top side in FIG. 1).

A securing member 107 (e.g., a flexible tie such as a cable tie) may be formed as a single, integral item, and not as a compound item formed of separate parts. A securing member 107 may be a longitudinal member (long, thin member) but flexible. (Extension member 102 may be a longitudinal member but rigid.)

As described herein, extension members 102 and connectors 104 collectively form a framework or configuration for holding/securing, routing/guiding, and managing wires, at one or more distances from (height above) a base. The term "system" (e.g., system 100) as used herein may refer to such an assembled framework or configuration, or to a collection of unassembled components thereof. Generally speaking, such components include extension members 102, connectors 104, and securing members 107. In some embodiments, such components include fasteners (e.g., studs 351 and nuts 353) for mounting connectors 104 to base 101. Wires 105 (or bundles 103 thereof) and base 101 may be but are not necessarily part of system 100.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise or so dictated by the description herein.

Similarly, although example methods or processes have been described with regard to particular steps or operations performed in a particular sequence, numerous modifications could be applied to those methods or processes to derive numerous alternative embodiments of the present invention. For example, alternative embodiments may include methods or processes that use fewer than all of the disclosed steps or operations, methods or processes that use additional steps or operations, and methods or processes in which the individual steps or operations disclosed herein are combined, subdivided, rearranged, or otherwise altered. Similarly, this disclosure describes one or more embodiments wherein various operations are performed by certain systems, applications, module, components, etc. In alternative embodiments, however, those operations could be performed by different components.

What is claimed is:

1. A system, comprising: a control panel, a door of the control panel including a surface; wire routing members configured for connection to the control panel, the wire routing members comprising: a plurality of connectors, each connector of the plurality of connectors being a monolithic structure, each connector having: a mounting portion for connecting to the surface of the control panel, a stem extending from the mounting portion, and a first leg extending from the stem in a plane perpendicular to the longitudinal axis of the stem; and two or more extension members, wherein at least one connector of the plurality of connectors is attachable to the two or more extension members, wherein the plurality of connectors comprise two or more multi-level connectors, each multi-level connector configured for attachment to two or more extension members, such that the wire routing members are further configured for holding one or more wires at different distances from a base of the multi-level connector, wherein each multi-level connector comprises: at least two legs extending from a stem of the multi-level connector, wherein a first leg of the at least two legs is positioned along the stem at a different distance from the base than a second leg of the at least two legs, and wherein an axis of the first leg is parallel to an axis of the second leg, wherein a first end of the first leg and a first end of the second leg are directly attached to the stem, and wherein the first leg and the second leg are oriented 180 degrees apart about the stem.

2. The system of claim 1, wherein the plurality of connectors comprise one or more connectors selected from the group consisting of the following types of connectors: an end connector, a straight connector, an elbow connector, a tee connector, and an X connector.

3. The system of claim 1, further comprising a third leg of the multi-level connector extending outwardly from the stem at a same height of first leg or the second leg.

4. The system of claim 1, wherein the first leg of the at least two legs is disposed at a first height above the mounting portion and the second leg of the at least two legs is disposed at a second height from the mounting portion, the second height greater than the first height.

5. The system of claim 1, wherein the plurality of connectors and the two or more extension members provide a modular wire arrangement system having a framework with two levels, each level at a different height above the mounting portion.

6. A system, comprising: a control panel; a plurality of extension members, configured for routing electrical wires along the control panel; and a plurality of connectors, each connector being a monolithic structure, each connector configured for connecting one or more of the plurality of extension members to one or more other ones of the plurality of extension members, each of the plurality of connectors comprising: a stem extending from a mounting portion of each connector, wherein each mounting portion comprises mounting holes; a first leg extending from the stem in a plane perpendicular to a longitudinal axis of the stem, wherein a first end of the first leg is directly attached to the stem, and a second end of the first leg opposite the first end has a female connecting portion; a second leg extending from the stem in a plane perpendicular to a longitudinal axis of the stem, wherein a first end of the second leg is directly attached to the stem, and a second end of the second leg opposite the first end has a female connecting portion, wherein the first leg and the second leg are disposed at a same height above the mounting portion, and wherein the first leg and the second leg are oriented 180 degrees apart about the stem, wherein a passage is formed from the first end of the first leg through the stem and to the first end of the second leg; and fasteners positioned through the mounting holes to removably fix each connector to a surface of the control panel, wherein the surface is a door of the control panel, wherein each of the plurality of extension members comprises a male connecting portion and wherein the male connecting portion and the female connecting portion of the first leg and the second leg are configured for interconnection by a friction fit, and wherein at least one extension member of the plurality of extension members extends through the passage and extend from first end of the first leg, through the stem, and through the second end of the second leg.

7. The system of claim 6, wherein the mounting portion is formed of a material that is not electrically conductive.

8. The system of claim 6, wherein the mounting portion is formed of a thermoplastic polymer.

9. The system of claim 8,
wherein the mounting portion is formed of acrylonitrile styrene acrylate (ASA).

10. The system of claim 6, wherein the plurality of connectors and the plurality of extension members are collectively configured for holding the electrical wires at different distances from the surface.

11. The system of claim 6, wherein at least one of the plurality of connectors comprises a third leg extending from the stem in a plane perpendicular to the longitudinal axis of the stem, wherein the third leg is disposed at the same height above the mounting portion as the first leg or the second leg, and wherein the third leg is oriented 90 degrees apart about the stem from the first leg and the second leg.

* * * * *